(12) United States Patent
Kroll

(10) Patent No.: US 9,279,712 B2
(45) Date of Patent: Mar. 8, 2016

(54) LOW PROFILE LOAD CELLS FOR USE WITH A SCALE

(71) Applicant: William P. Kroll, Medina, MN (US)

(72) Inventor: William P. Kroll, Medina, MN (US)

(73) Assignee: Intercomp Company, Medina, MN (US)

( * ) Notice: Subject to any disclaimer, the term of this patent is extended or adjusted under 35 U.S.C. 154(b) by 188 days.

(21) Appl. No.: 14/051,268

(22) Filed: Oct. 10, 2013

(65) Prior Publication Data

US 2014/0209395 A1 Jul. 31, 2014

Related U.S. Application Data

(60) Provisional application No. 61/712,033, filed on Oct. 10, 2012.

(51) Int. Cl.
*G01G 3/14* (2006.01)
*G01G 19/03* (2006.01)
*G01L 1/20* (2006.01)
*G01G 19/02* (2006.01)

(52) U.S. Cl.
CPC ............... *G01G 3/14* (2013.01); *G01G 19/024* (2013.01); *G01L 1/205* (2013.01)

(58) Field of Classification Search
CPC ..... G01G 3/14; G01G 19/024; G01G 19/042; G01G 19/045; G01G 19/047; G01L 1/205
See application file for complete search history.

(56) References Cited

U.S. PATENT DOCUMENTS

| | | | | | |
|---|---|---|---|---|---|
| 3,266,584 | A | * | 8/1966 | Lee ................................ | 177/134 |
| 3,446,298 | A | * | 5/1969 | Schrader et al. ................... | 177/7 |
| 3,593,263 | A | * | 7/1971 | Olsen ........................... | 340/935 |
| 3,935,913 | A | * | 2/1976 | Wagner et al. ................ | 177/134 |
| 3,949,822 | A | * | 4/1976 | English et al. ................ | 177/126 |
| 4,020,911 | A | * | 5/1977 | English et al. ................ | 177/136 |
| 4,333,543 | A | * | 6/1982 | Pietzsch et al. ............... | 177/134 |
| 4,616,723 | A | * | 10/1986 | Pietzsch et al. ............... | 177/211 |
| 4,799,381 | A | * | 1/1989 | Tromp ............................ | 73/146 |
| 5,294,756 | A | * | 3/1994 | Lauber et al. ................. | 177/119 |
| 6,495,774 | B1 | * | 12/2002 | Pederson ...................... | 177/136 |
| 6,706,976 | B1 | * | 3/2004 | Schuler ......................... | 177/126 |
| 7,241,956 | B1 | * | 7/2007 | Stimpson ...................... | 177/136 |
| 8,080,742 | B2 | * | 12/2011 | Bergan et al. ................. | 177/132 |
| 2003/0010542 | A1 | * | 1/2003 | Simons ........................ | 177/136 |
| 2011/0303469 | A1 | * | 12/2011 | Saito et al. ................... | 177/136 |
| 2014/0299390 | A1 | * | 10/2014 | Kroll et al. ........................ | 177/1 |

* cited by examiner

*Primary Examiner* — Randy W Gibson
(74) *Attorney, Agent, or Firm* — Skinner and Associates; Joel Skinner

(57) ABSTRACT

A low profile, high capacity load cell suitable for use in connection with in motion weighing or other weighing scales and systems. Also disclosed are scales for use with the load cell, and systems for using the scales. The load cells are especially suited for use in high speed in-motion weighing.

30 Claims, 29 Drawing Sheets

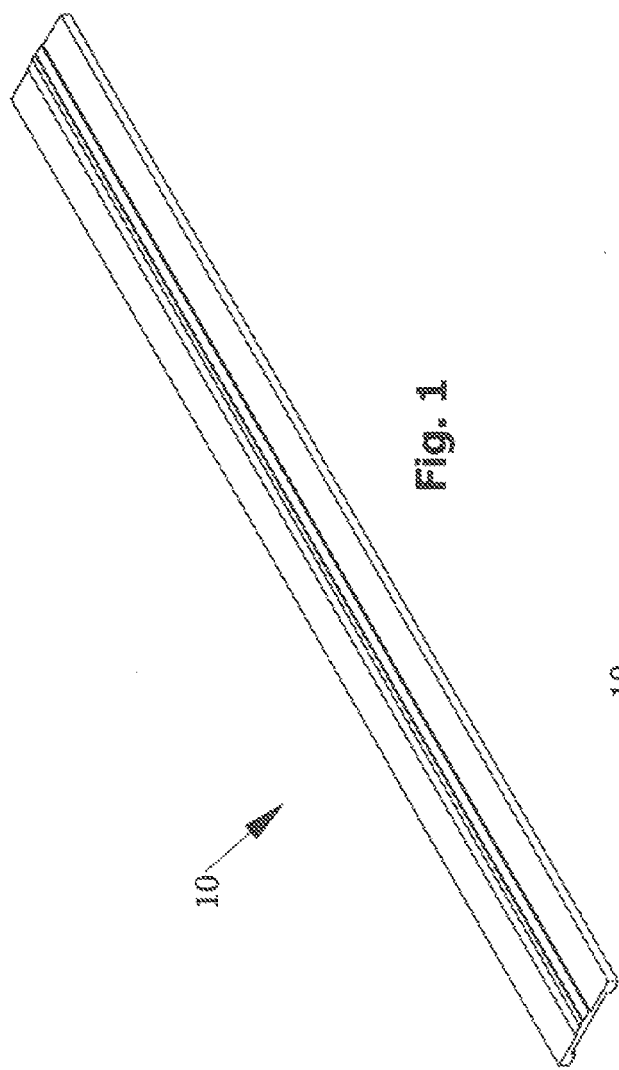
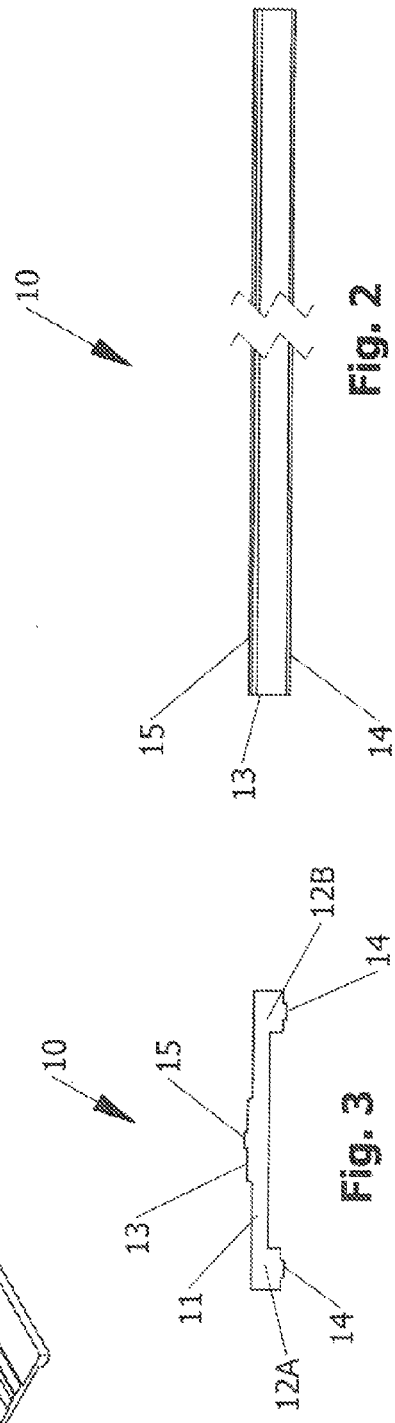
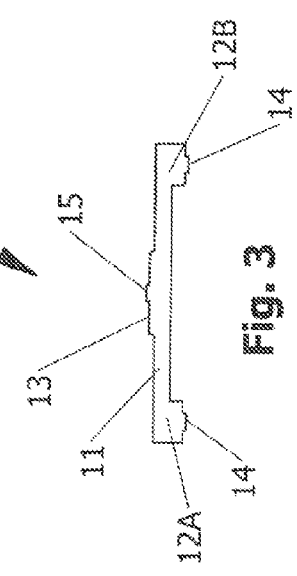

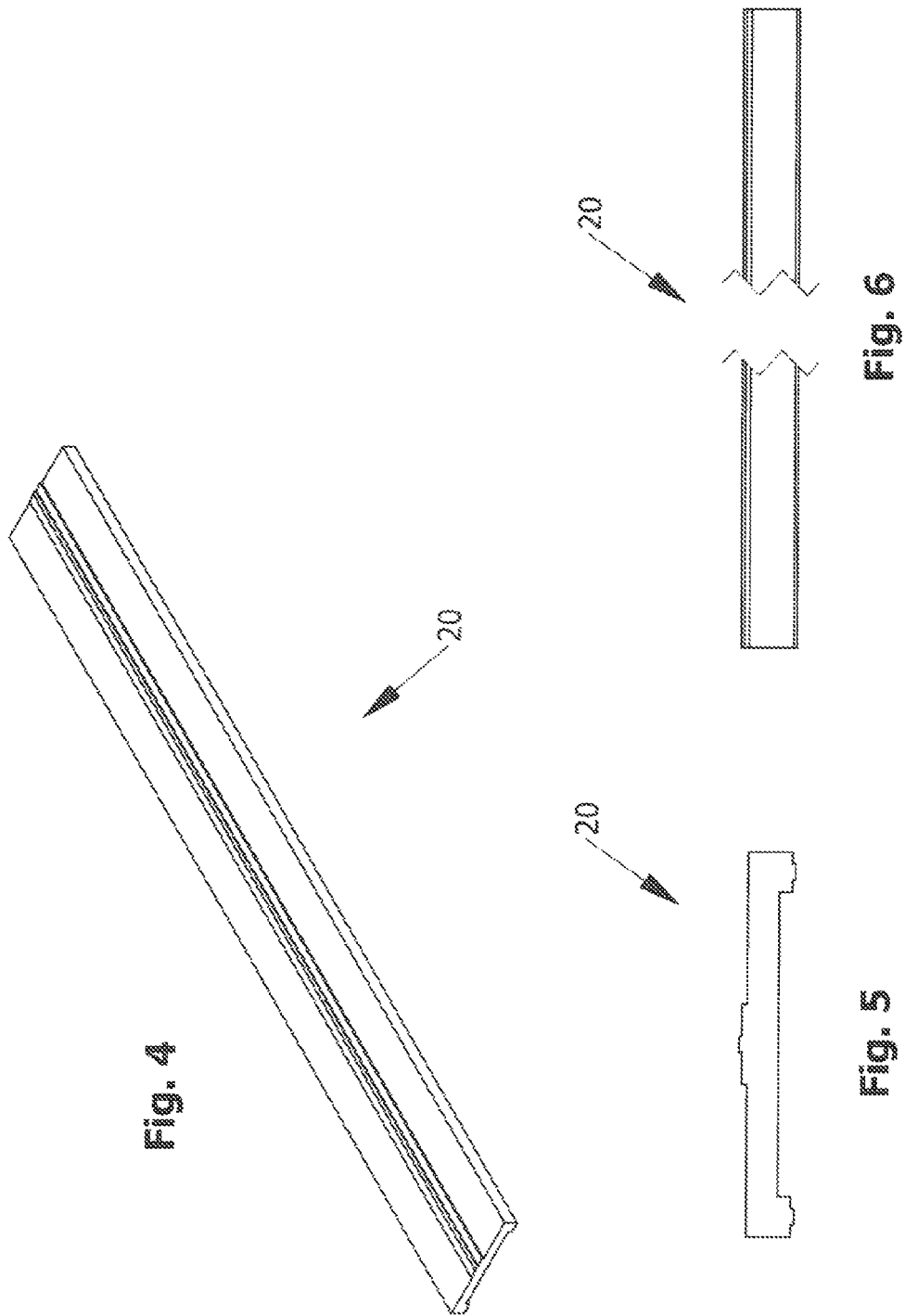

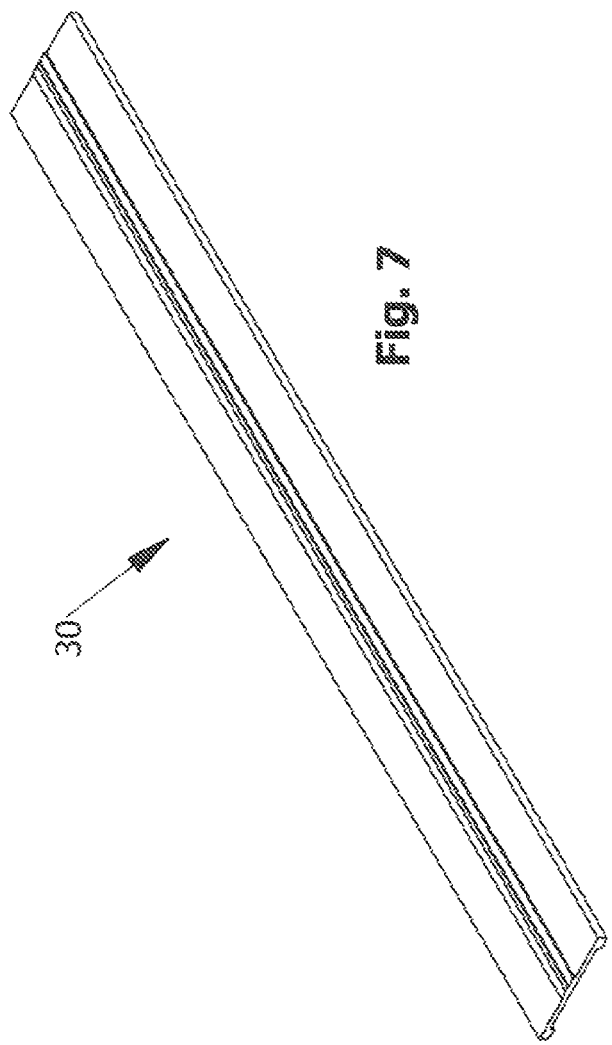
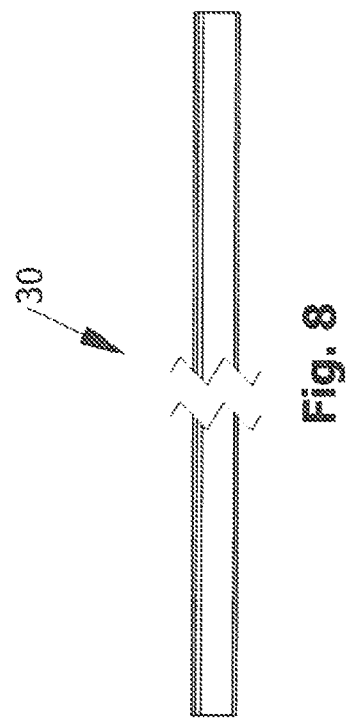
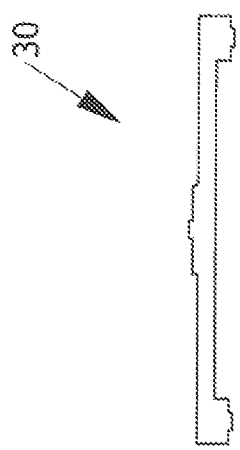
Fig. 7
Fig. 8
Fig. 9

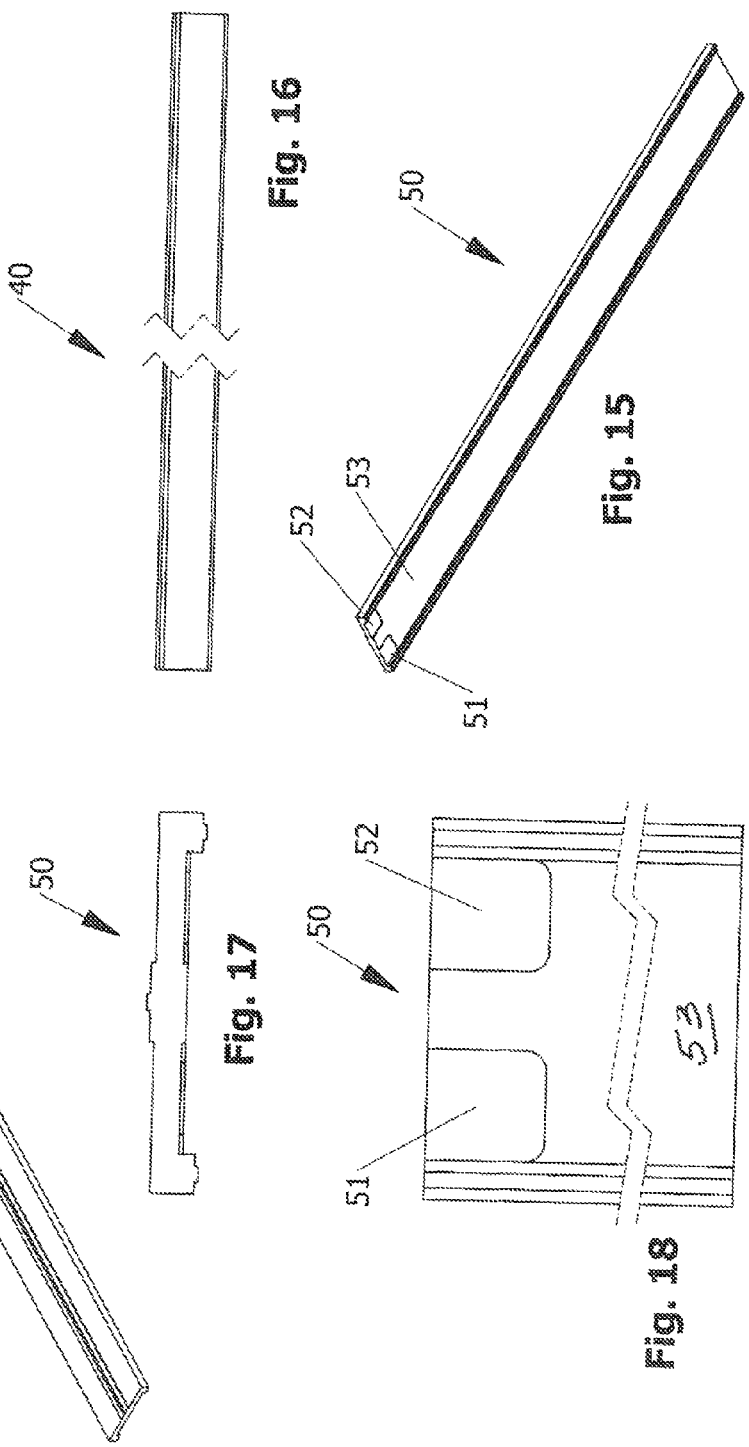

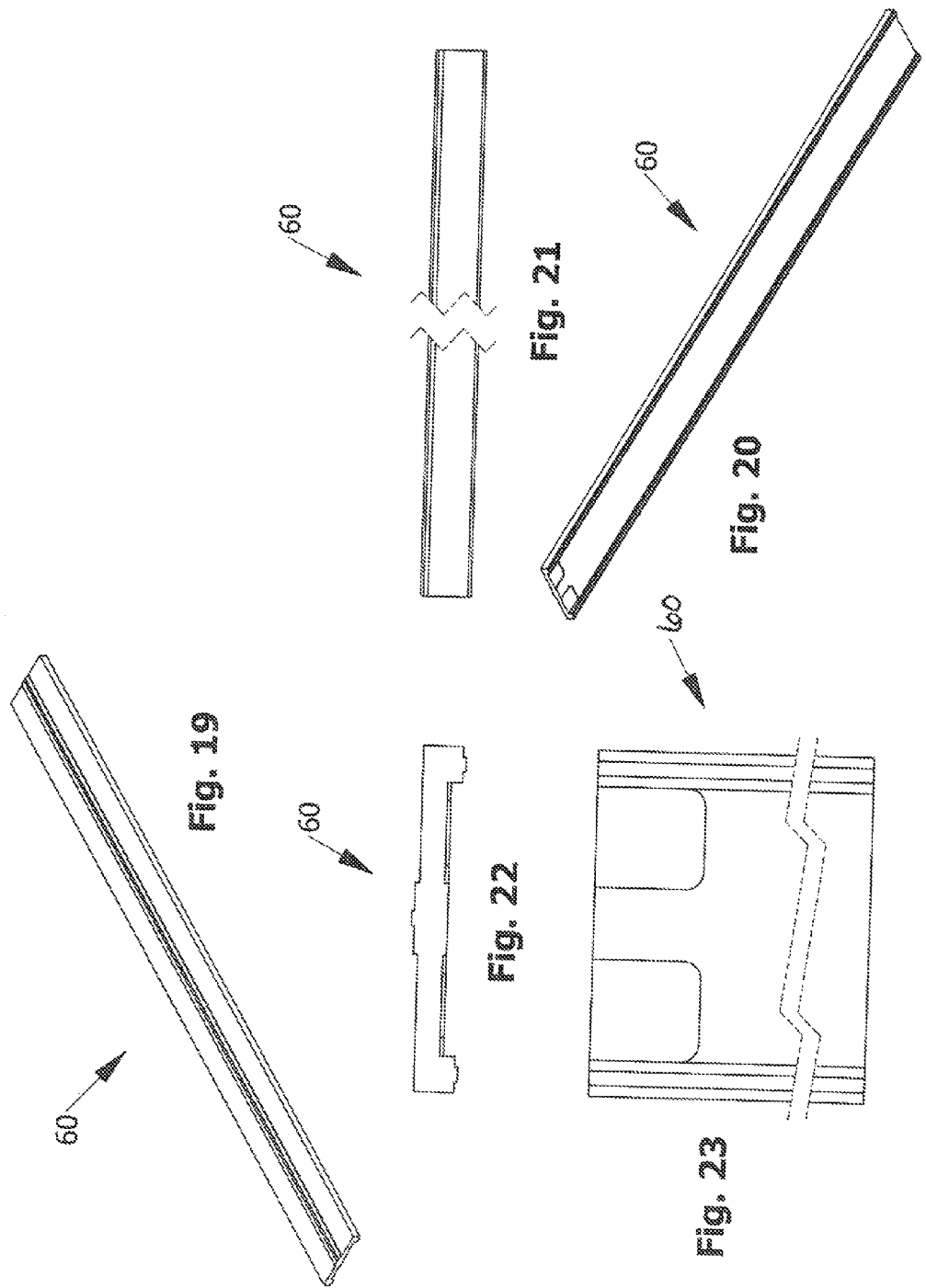

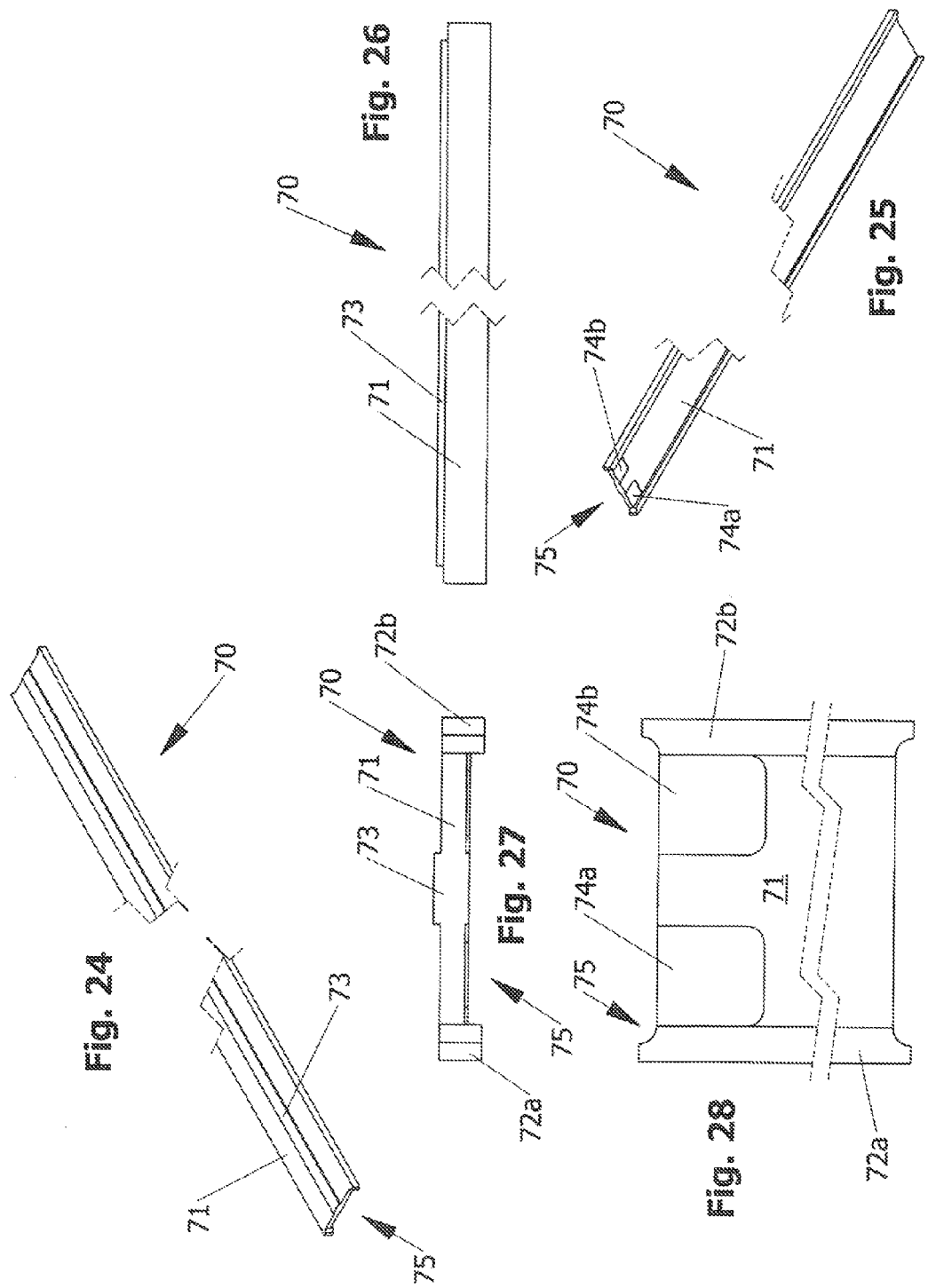

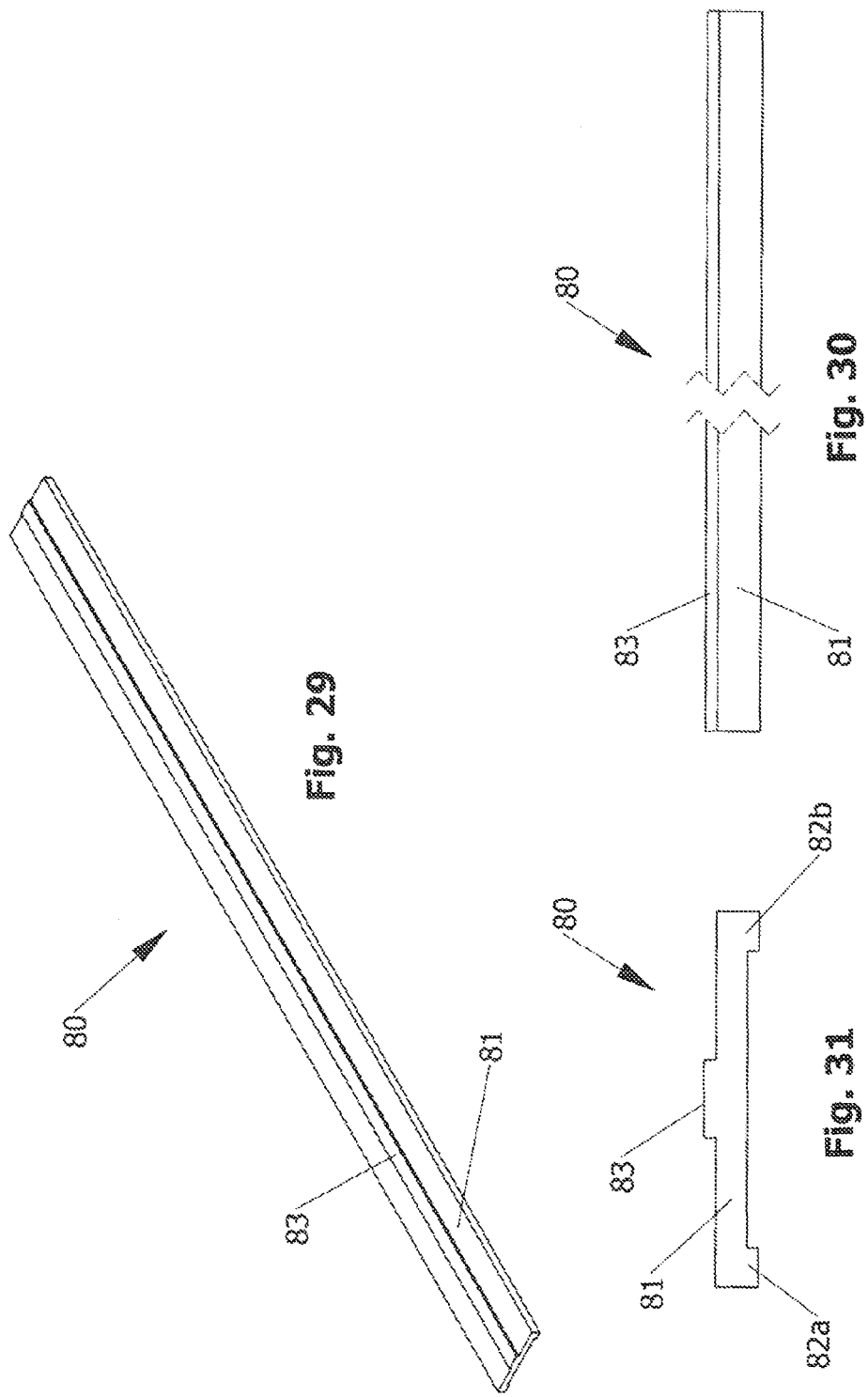

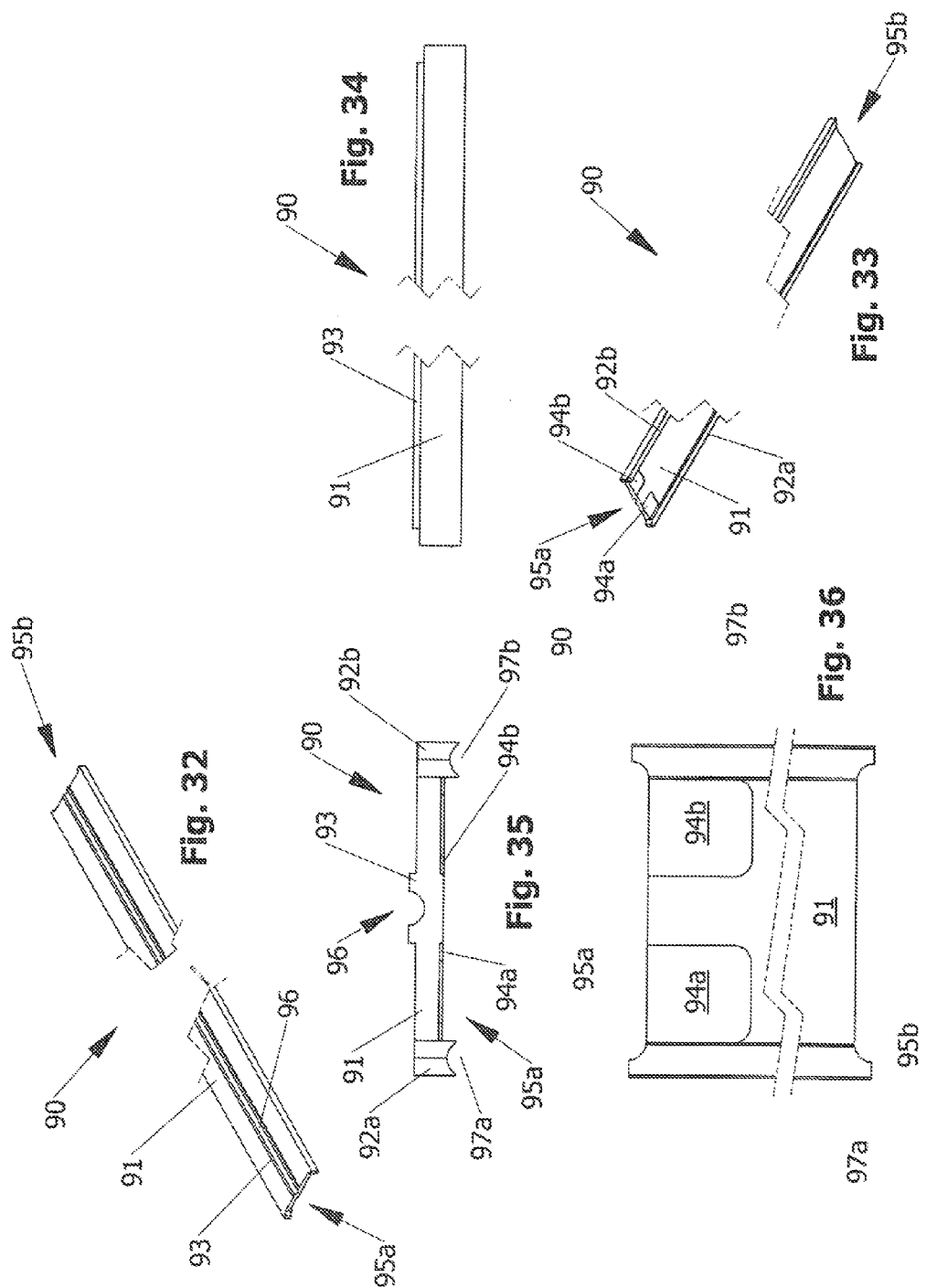

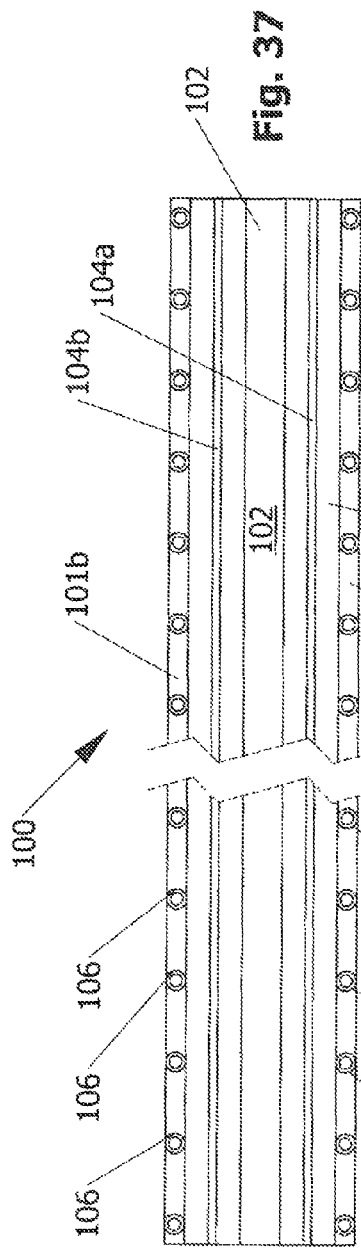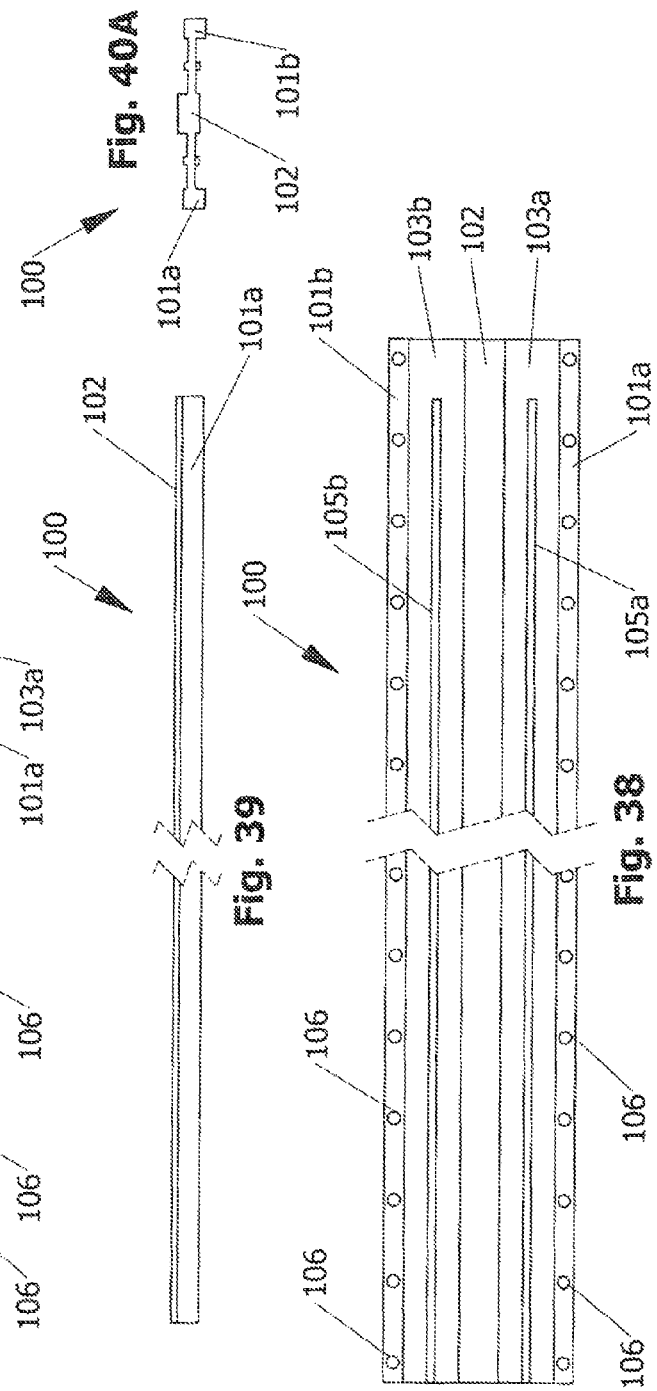

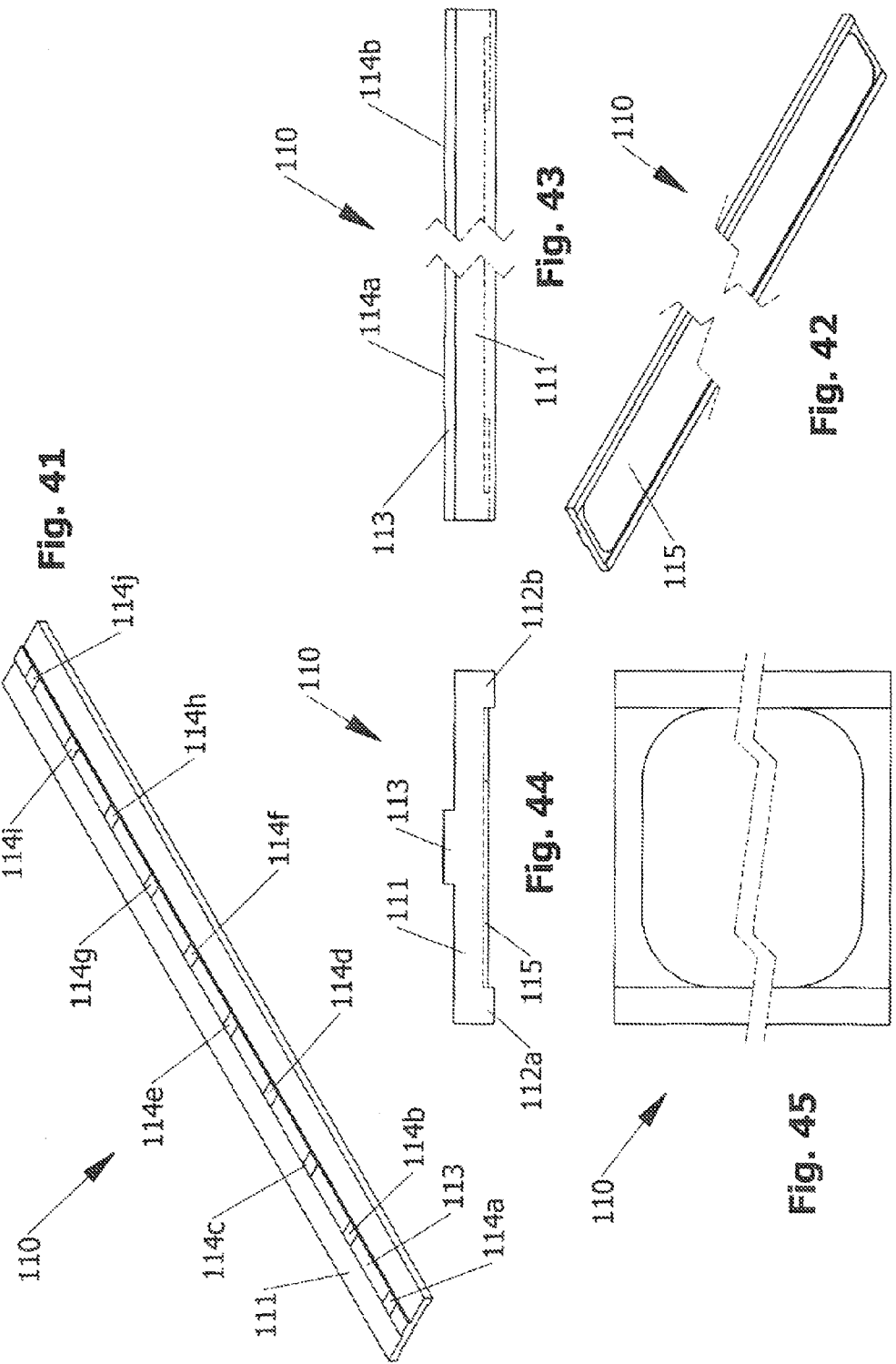

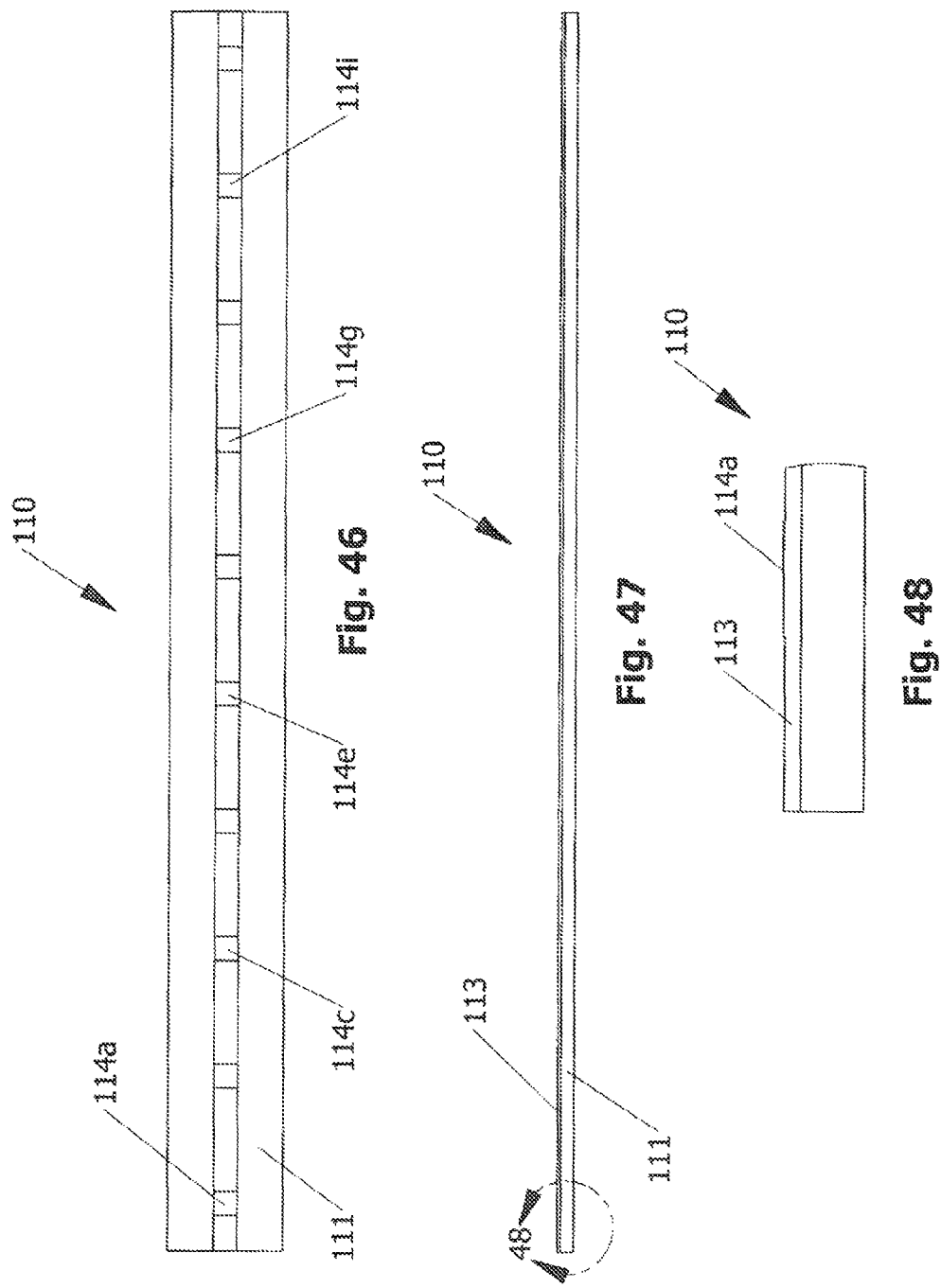

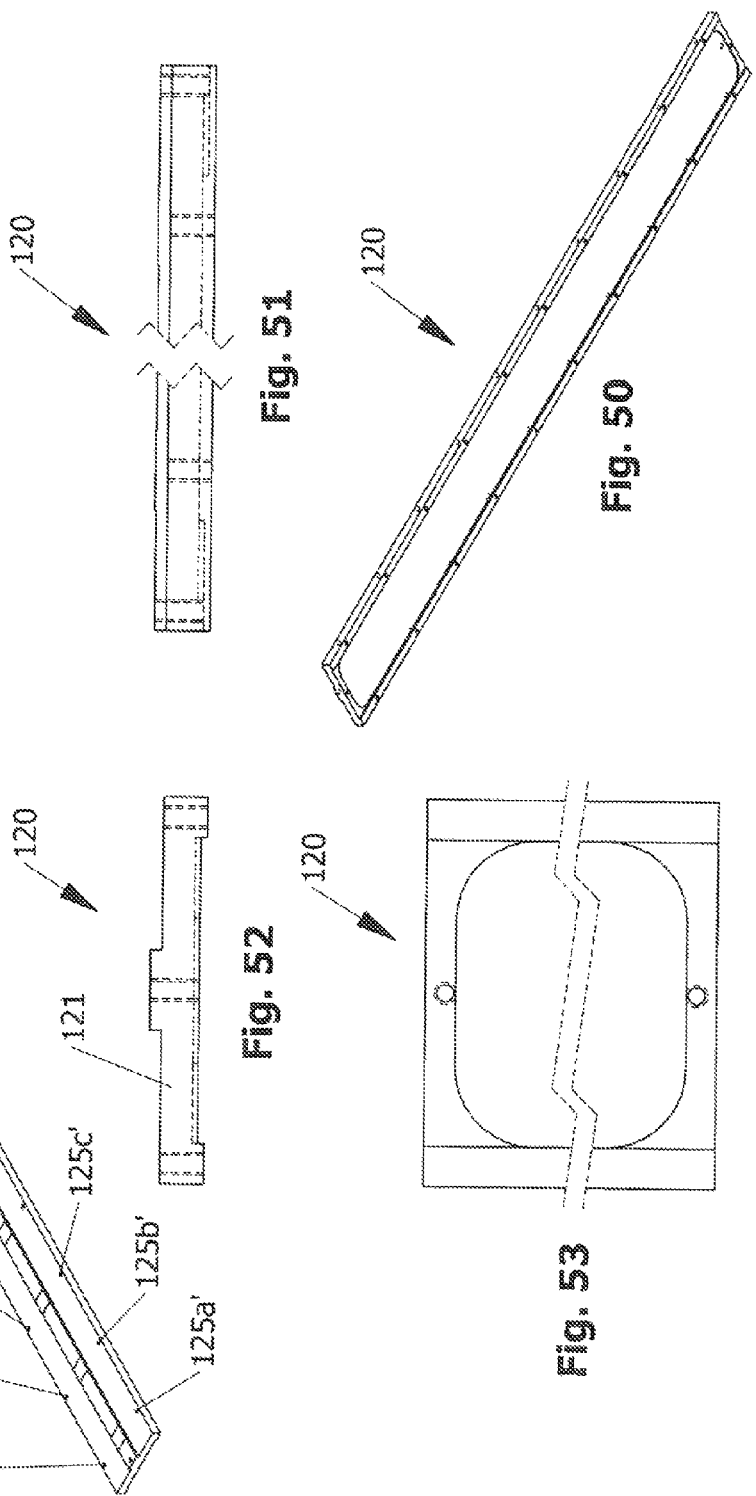

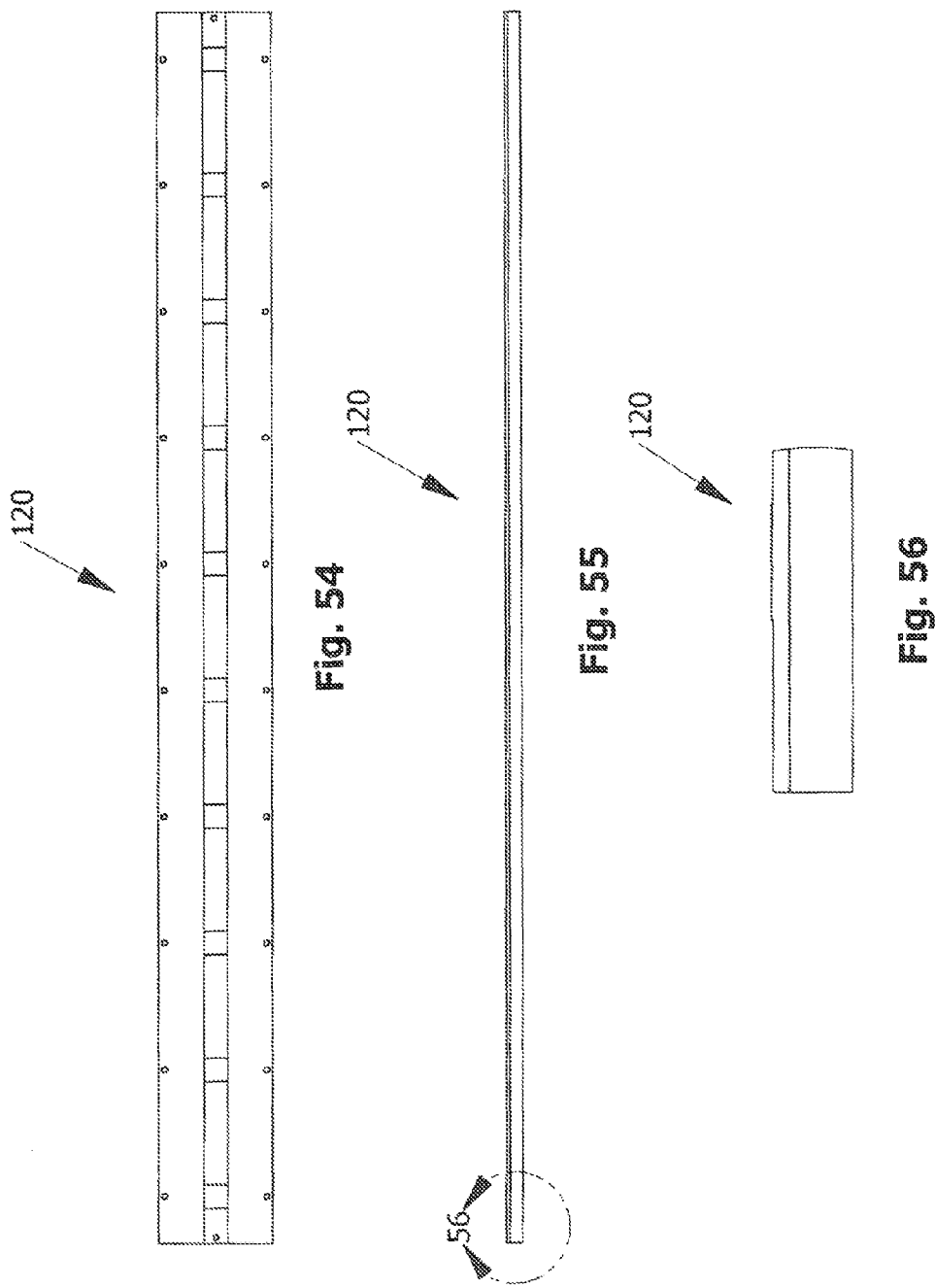

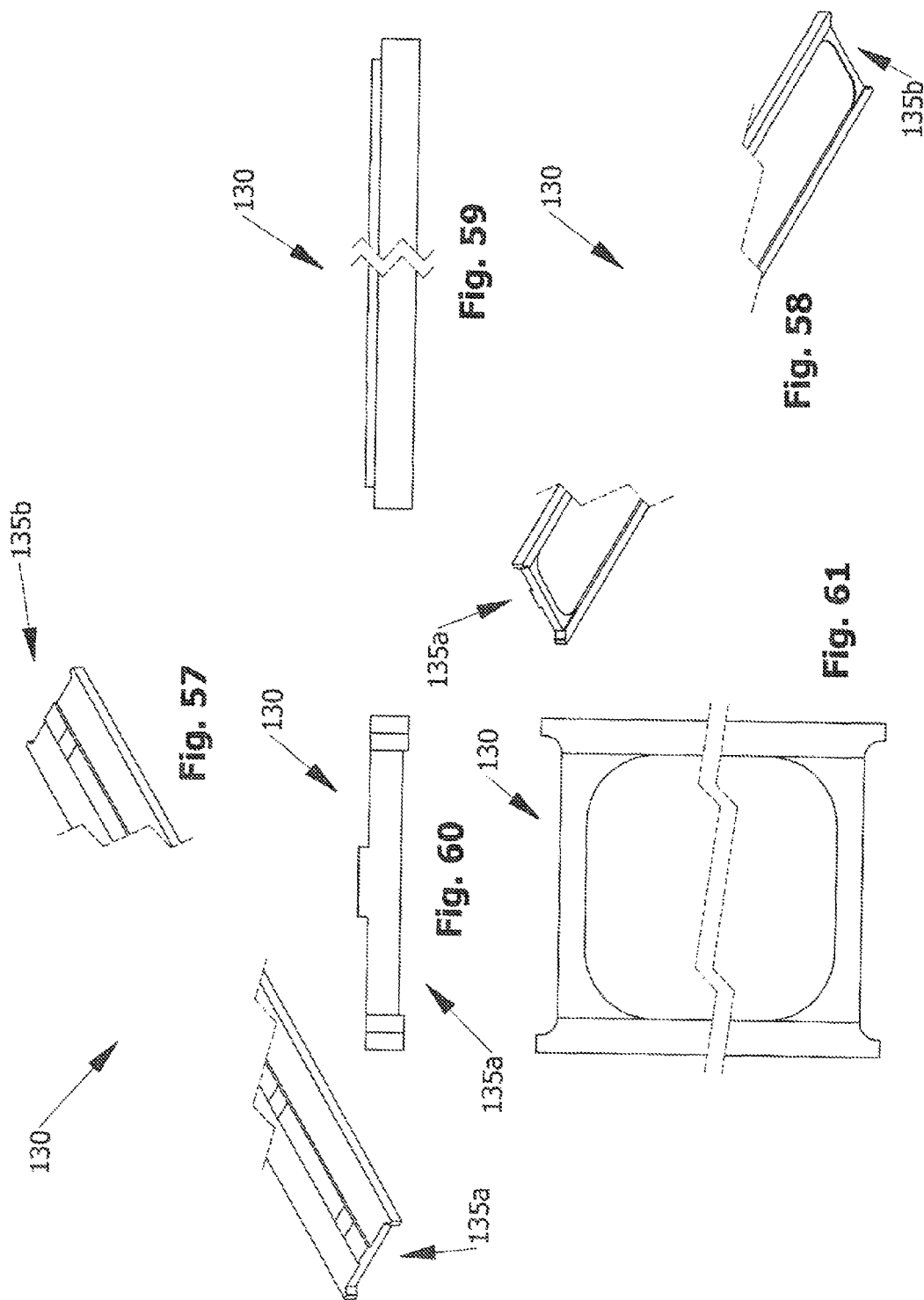

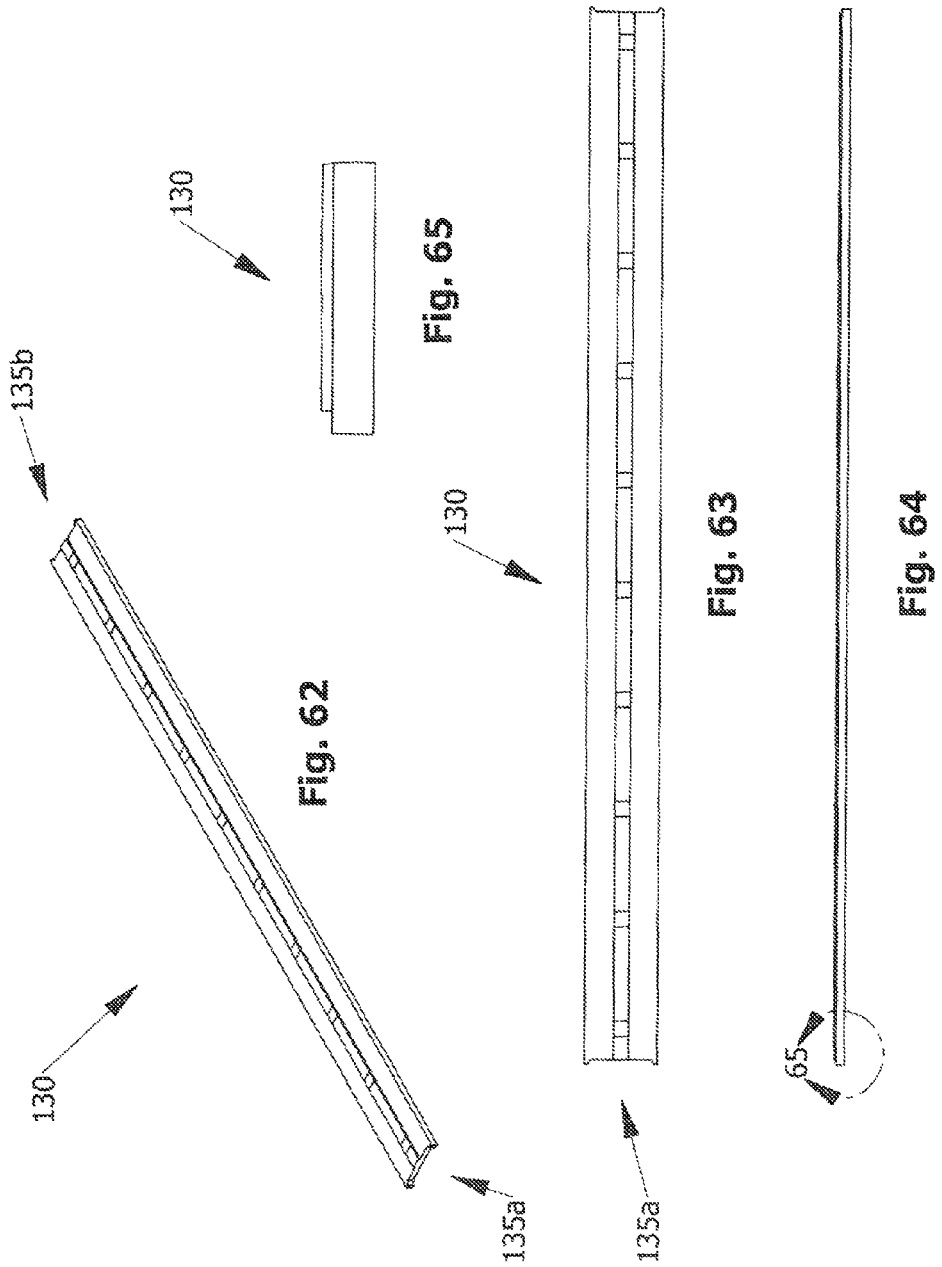

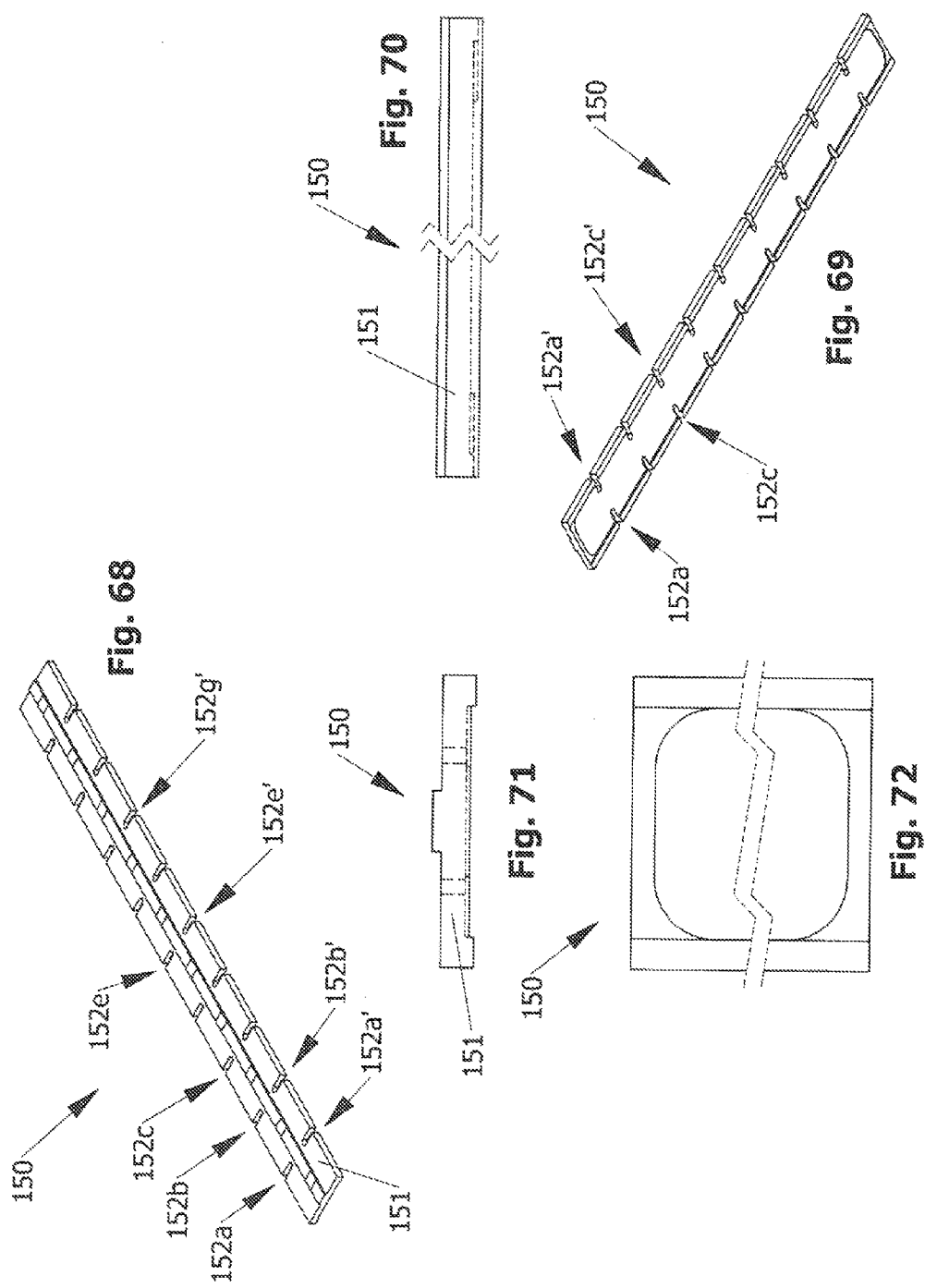

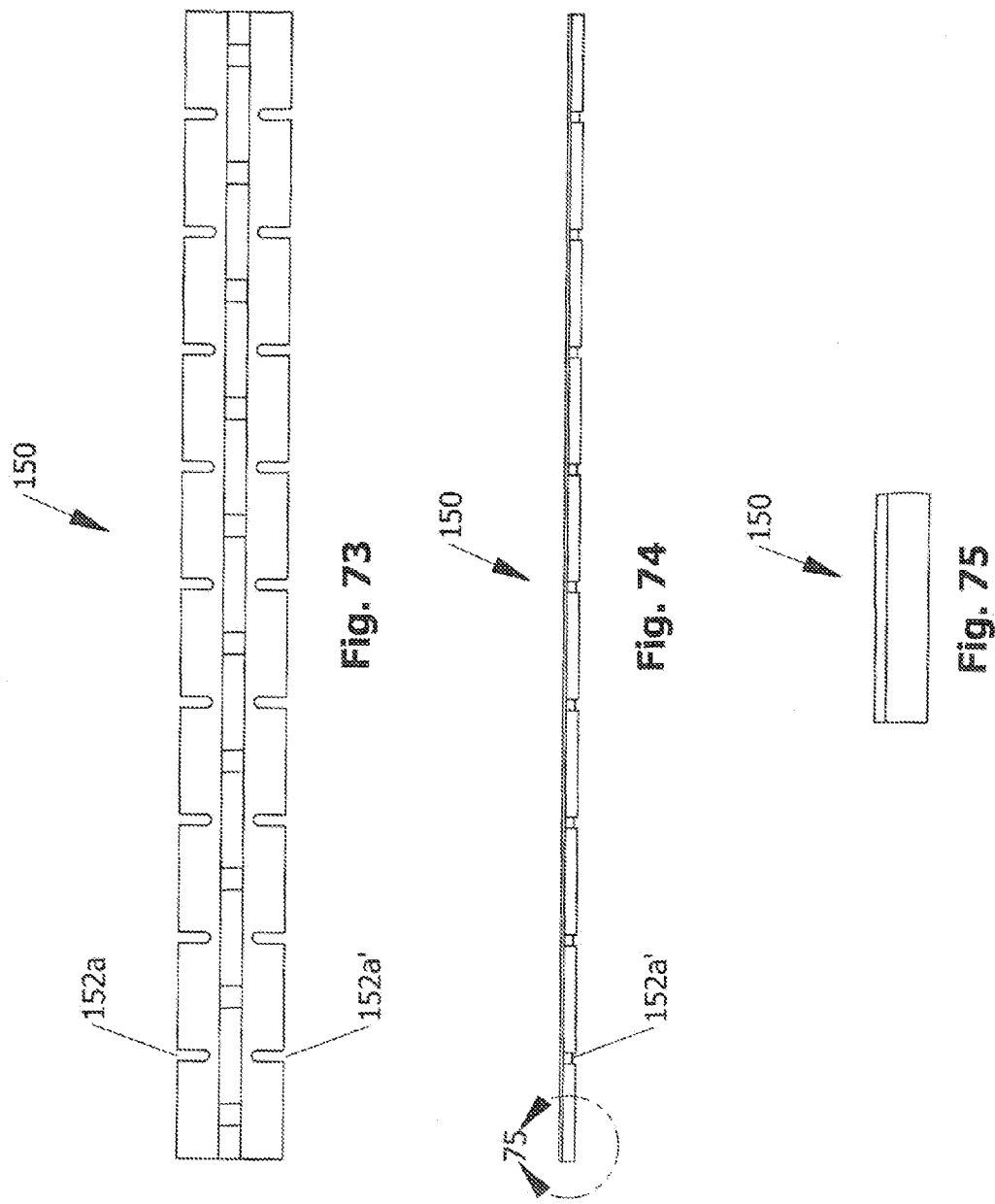

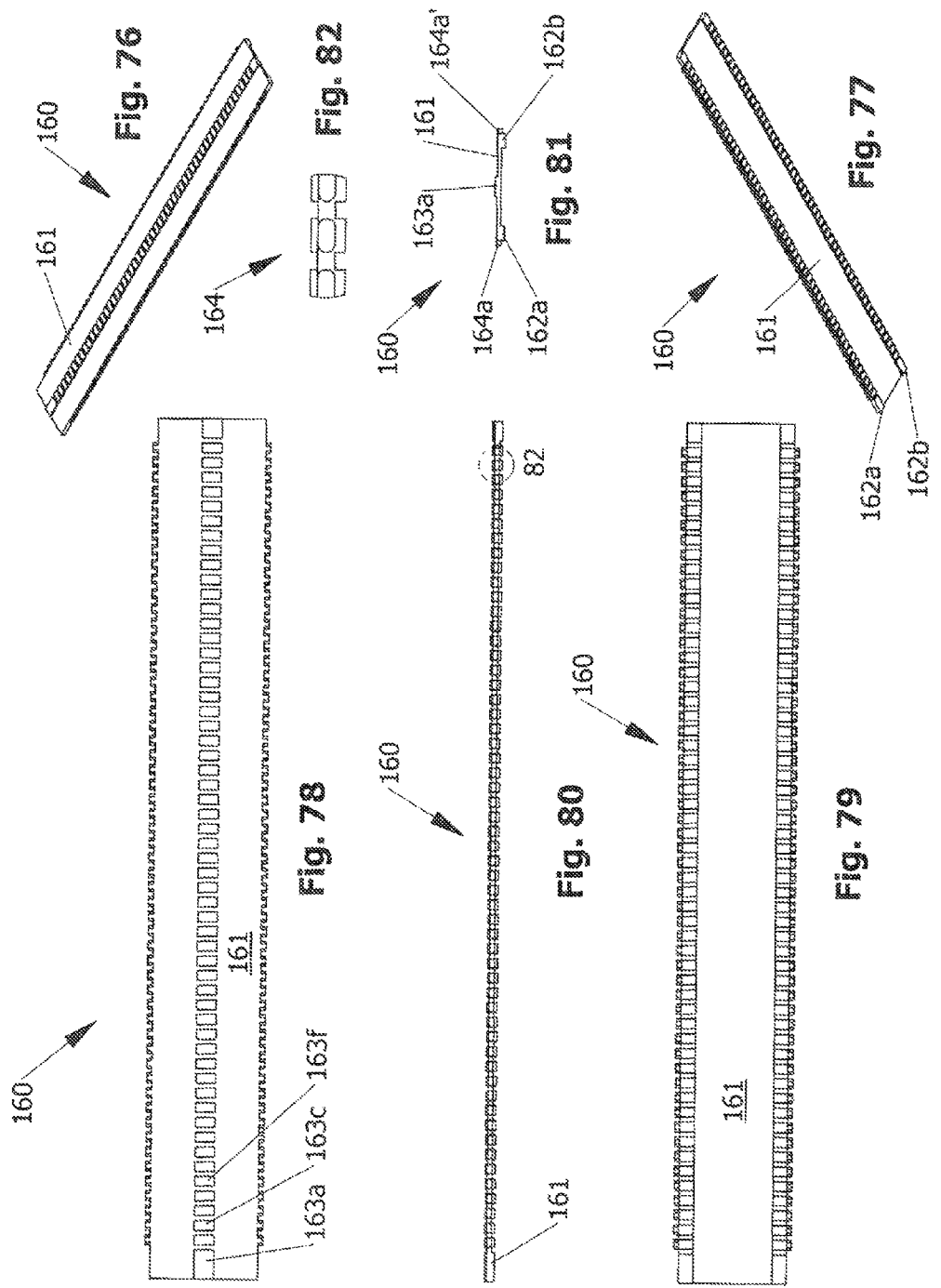

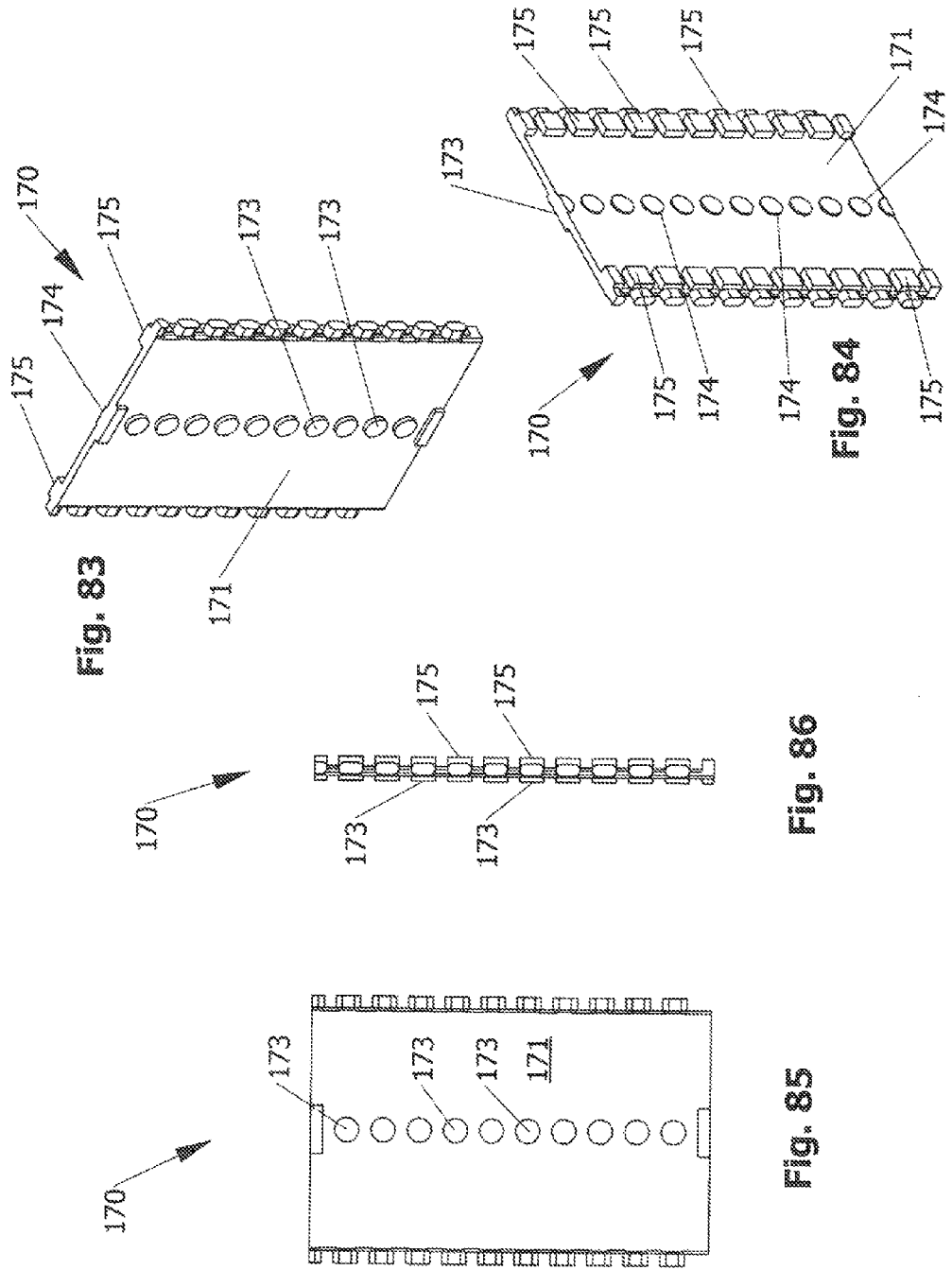

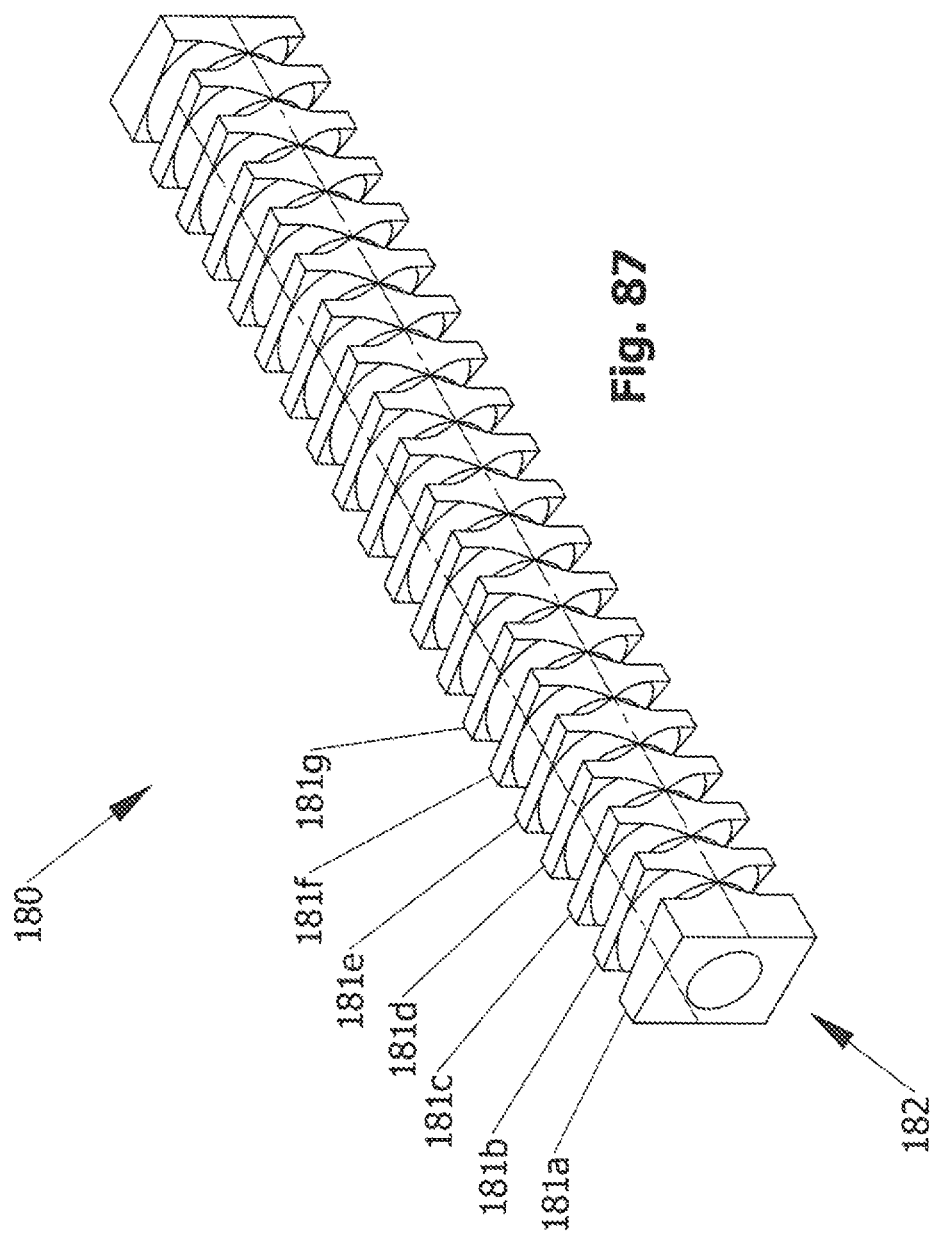

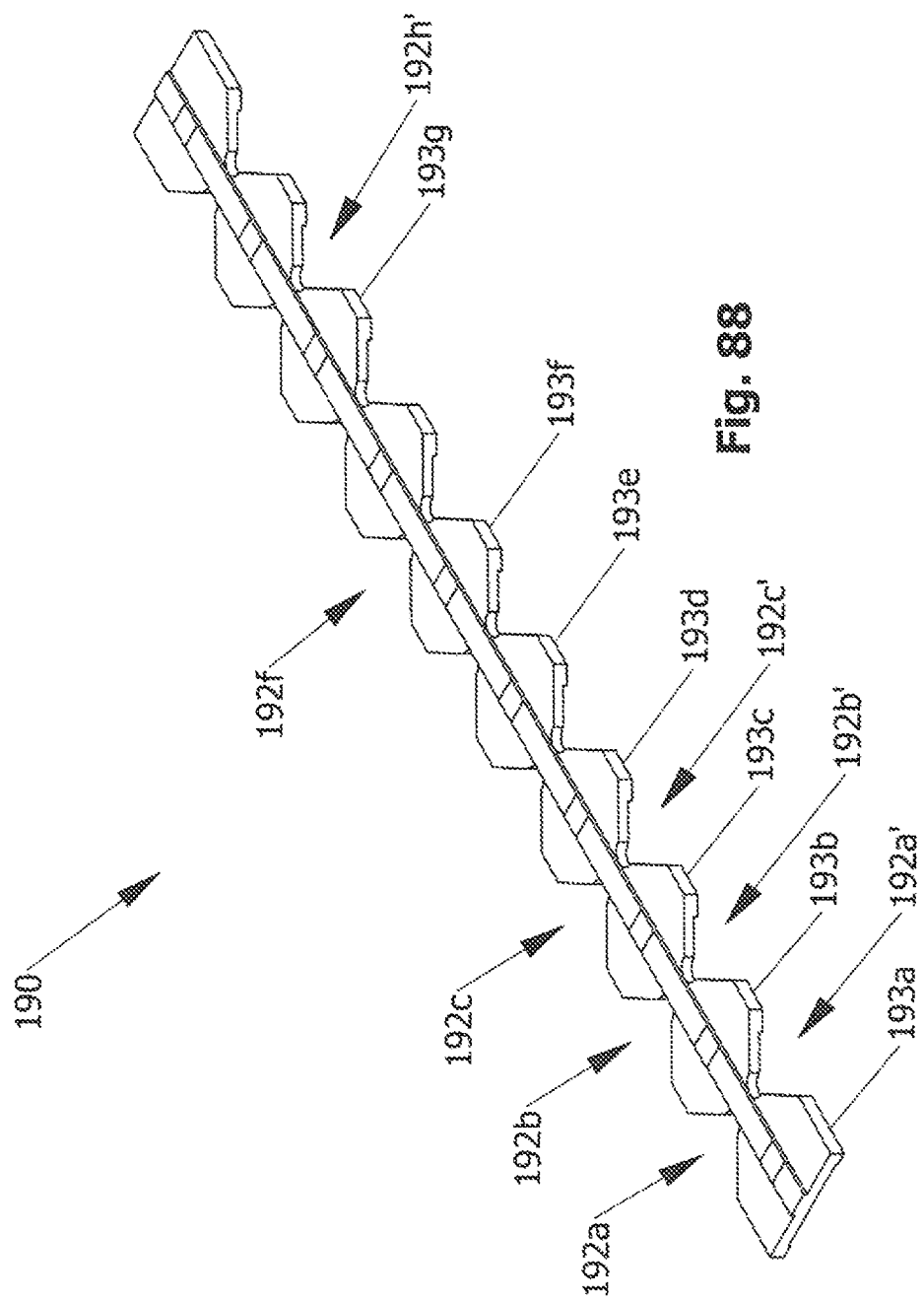

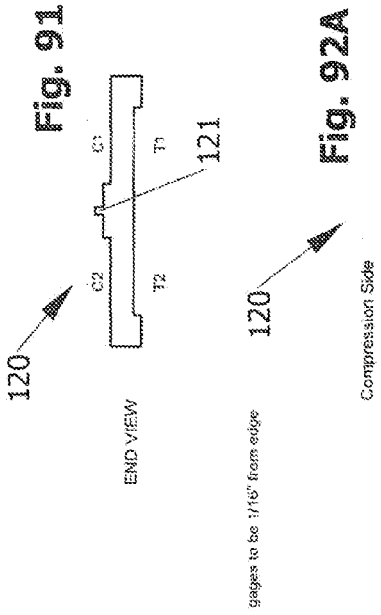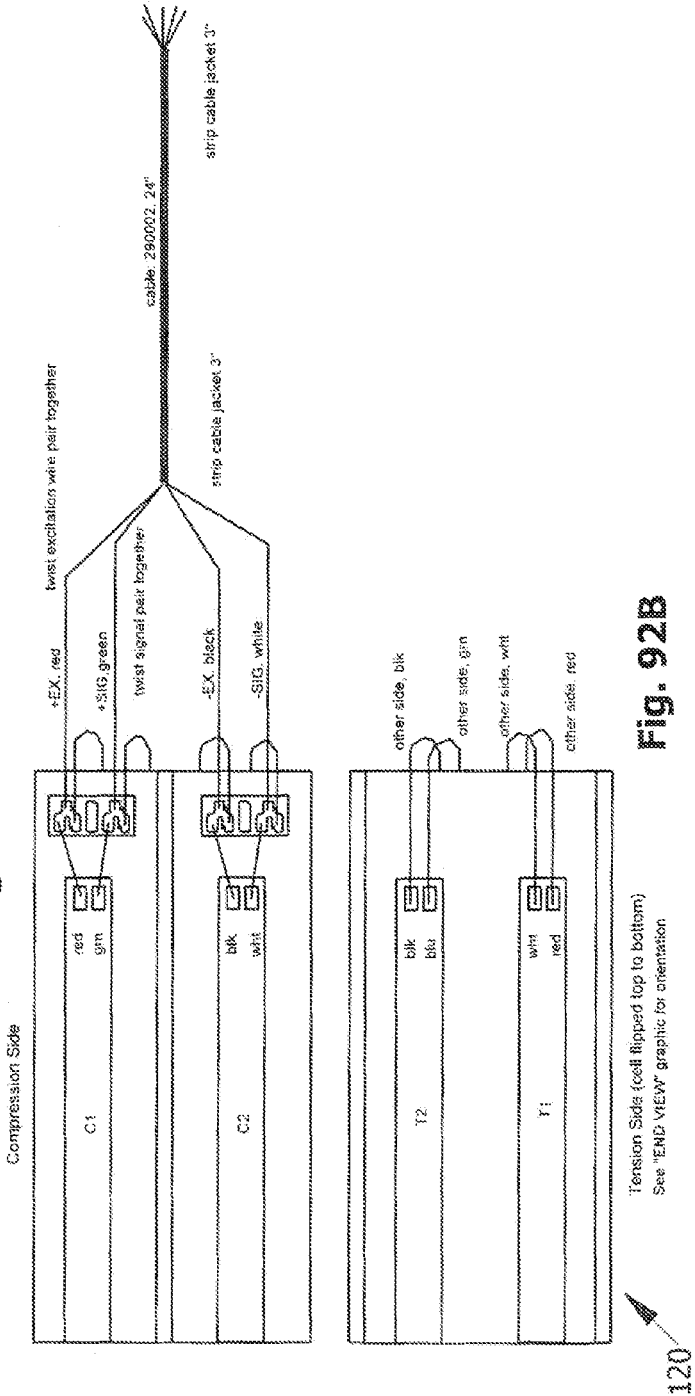

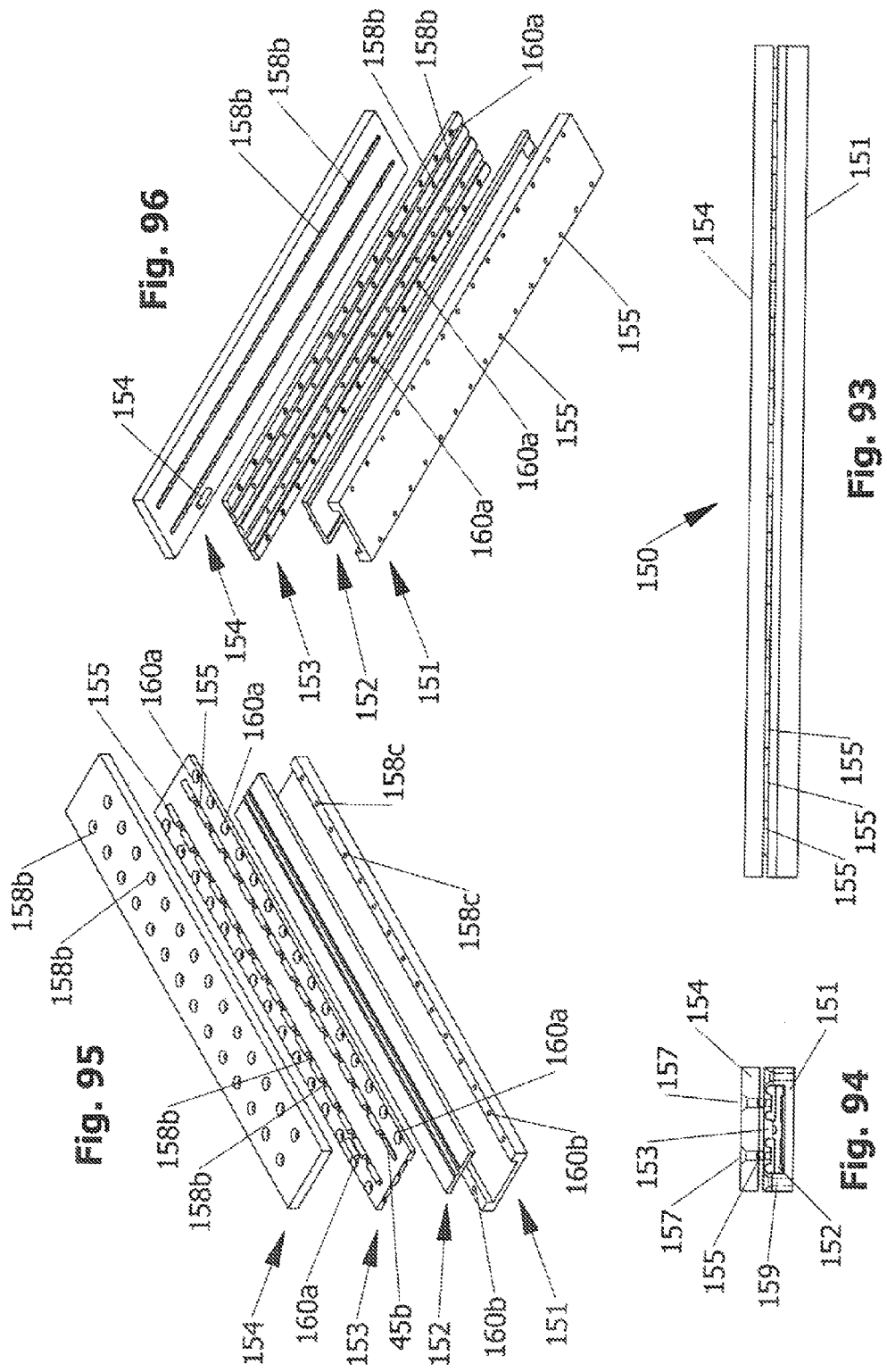

LOW PROFILE LOAD CELLS FOR USE WITH A SCALE

CROSS REFERENCE TO RELATED APPLICATIONS, IF ANY

This application claims the benefit under 35 U.S.C. §119(e) of co-pending U.S. Provisional Patent Application Ser. No. 61/712,033, filed Oct. 10, 2012, which is hereby incorporated by reference.

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to weighing systems, apparatus and methods. Particularly, the invention relates to elongated, low profile load cells used for example in a scale to weigh vehicles or other articles. The load cells are particularly well suited for use in strip-type scales, that weigh vehicles or articles while they are in motion, most particularly high speed motion of up to 80 miles per hour.

2. Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides load cell apparatus and methods which are practical, reliable, accurate and efficient, and which are believed to constitute an improvement over the background technology.

In one aspect, the invention provides a load cell having a low profile, strip configuration, comprising an elongated body having a longitudinal aspect and opposing first and second sides, a pair of legs disposed on the first side, and a rail disposed on the second side.

In another aspect, the invention provides a low profile, strip electronic load cell for use in in-motion weighing of vehicles or cargo passing over the scale, the load cell having an elongated, thin geometry with a length of between 20.0-78.7 inches (0.5-2.0 meters), a width approximately 2.0-6.0 inches (5.08-15.24 cm) and a height approximately 1.465 to 1.475 inches, comprising: (a) a body, the body having a rectangular shape with a longitudinal aspect, opposing top and bottom sides and opposing longitudinal edges, the body having a predetermined length, width and thickness; (b) a pair of legs formed unitarily with the body on the bottom side thereof, the legs being disposed proximate the opposing longitudinal edges of the body, the legs defining a central recess along the first side of the body between the legs, the legs further extending the length of the body, and (c) a rail formed unitarily with the body on the top side thereof, the rail being disposed centrally and longitudinally with respect to the body, the rail extending the length of the body.

In a further aspect, the invention provides a method of weighing vehicles or cargo moving over a surface while the vehicles or cargo are moving: (a) providing an electronic load cell having an elongated, thin, strip geometry, comprising: (i) a body, the body having a rectangular shape with a longitudinal aspect, opposing top and bottom sides and opposing longitudinal edges, the body having a predetermined length, width and thickness; (ii) a pair of legs formed unitarily with the body on the bottom side thereof, the legs being disposed proximate the opposing longitudinal edges of the body, the legs defining a central recess along the first side of the body between the legs, the legs further extending the length of the body, and (iii) a rail formed unitarily with the body on the top side thereof, the rail being disposed centrally and longitudinally with respect to the body, the rail extending the length of the body; (b) placing the load cell on or in a surface, whereby a predetermined portion of the rail is exposed to sense the weight of the vehicle or cargo passing over the load cell; (c) passing vehicles or cargo over the surface and the load cell; and (d) actuating the load cell and sensing a weight The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 1 is a perspective, or isometric view of a first embodiment of an elongated, low profile load cell of the present invention.

FIG. 2 is a side or elevation view of the first load cell embodiment.

FIG. 3 is an end view of the first load cell embodiment.

FIG. 4 is a perspective view of a second embodiment of a load cell of the present invention.

FIG. 5 is an end view of the second load cell.

FIG. 6 is a side view of the second load cell.

FIG. 7 is a perspective view of a third embodiment of the load cell of the present invention.

FIG. 8 is a side view of the third load cell.

FIG. 9 is an end view of the third load cell.

FIG. 14 is a perspective view of a fifth embodiment of the load cell of the invention.

FIG. 15 is another perspective view of the fifth load cell.

FIG. 16 is a side view of the fifth load cell.

FIG. 17 is an end view of the fifth load cell.

FIG. 18 is a detailed view of the ends of the fifth load cell, taken from the bottom of the load cell.

FIG. 19 is a perspective view of a sixth embodiment of the load cell of the invention.

FIG. 20 is another perspective view of the sixth load cell.

FIG. 21 is a side view of the sixth load cell.

FIG. 22 is an end view of the sixth load cell.

FIG. 23 is a detailed view of the ends of the sixth load cell, taken from the bottom of the load cell.

FIG. 24 is a perspective view of a seventh embodiment of the load cell of the invention.

FIG. 25 is another perspective view of the seventh load cell.

FIG. 26 is a side view, broken for clarity and to reduce length, of the seventh load cell.

FIG. 27 is an end view of the seventh load cell.

FIG. 28 is a detailed view of the ends of the seventh load cell, taken from the bottom of the load cell.

FIG. 29 is a perspective view of an eighth embodiment of the load cell of the invention.

FIG. 30 is a side view of the eighth load cell, broken for clarity.

FIG. 31 is an end view of the eighth load cell.

FIG. 32 is a perspective view of a ninth embodiment of the load cell of the invention.

FIG. 33 is another perspective view of the ninth load cell.

FIG. 34 is a side view of the ninth load cell, broken for clarity.

FIG. 35 is an end view of the ninth load cell.

FIG. 36 is a detailed view of the ends of the ninth load cell, taken from the bottom of the load cell.

FIG. 37 is a top view of a tenth embodiment of a load cell of the invention.

FIG. 38 is a bottom view of the tenth load cell.

FIG. 39 is a side view of the tenth load cell.

FIG. 41 is a perspective view of an eleventh embodiment of a load cell of the invention.

FIG. 42 is another perspective view of the eleventh load cell.

FIG. 43 is a side view of the eleventh load cell, broken for clarity.

FIG. 44 is an end view of the eleventh load cell.

FIG. 45 is a detailed view of the eleventh load cell.

FIG. 46 is a top view of the eleventh load cell.

FIG. 47 is a side view of the eleventh load cell.

FIG. 48 is a detailed view of the eleventh load cell taken at area -48- of FIG. 47.

FIG. 49 is a perspective view of a twelfth embodiment of the load cell of the invention.

FIG. 50 is another perspective view of the twelfth load cell.

FIG. 51 is a side view of the twelfth load cell, broken for clarity.

FIG. 52 is an end view of the twelfth load cell.

FIG. 53 is a detailed view of the twelfth load cell.

FIG. 54 is a top view of the twelfth load cell.

FIG. 55 is a side view of the twelfth load cell.

FIG. 56 is a detailed view of the twelfth load cell, taken are area -56- of FIG. 55.

FIG. 57 is a perspective view of a thirteenth embodiment of a load cell of the invention.

FIG. 58 is another perspective view of the thirteenth load cell.

FIG. 59 is a side view of the thirteenth load cell, broken for clarity.

FIG. 60 is an end view of the thirteenth load cell.

FIG. 61 is a detailed view of the thirteenth load cell.

FIG. 62 is perspective view of a fourteenth embodiment of a load cell of the invention.

FIG. 63 is a top view of the fourteenth load cell.

FIG. 64 is an side view of the fourteenth load cell.

FIG. 65 is detailed view of the fourteenth load cell, taken are area -65- of FIG. 64.

FIG. 68 is a top perspective view of a sixteenth embodiment of a load cell of the invention.

FIG. 69 is a bottom perspective view of the sixteenth load cell.

FIG. 70 is a side view of the sixteenth load cell, broken for clarity.

FIG. 71 is an end view of the sixteenth load cell.

FIG. 72 is a detailed view of the sixteenth load cell.

FIG. 73 is top view of the sixteenth load cell.

FIG. 74 is a side view of the sixteenth load cell.

FIG. 75 is a detailed view of the sixteenth load cell, taken at area -75- of FIG. 74.

FIG. 76 is a top perspective view of a seventeenth embodiment of a load cell of the invention.

FIG. 77 is a bottom perspective view of the seventeenth embodiment.

FIG. 78 is a top view of the seventeenth load cell.

FIG. 79 is a bottom view of the seventeenth load cell.

FIG. 80 is a side view of the seventeenth load cell.

FIG. 81 is an end view of the seventeenth load cell.

FIG. 82 is a detailed view of the seventeenth load cell, taken at area -82- of FIG. 80.

FIG. 83 is a first perspective view of an eighteenth embodiment of a load cell of the invention.

FIG. 84 is a second, opposite perspective view of the eighteenth load cell.

FIG. 85 is a top view of the eighteenth load cell.

FIG. 86 is a side view of the eighteenth load cell.

FIG. 87 a perspective view of a nineteenth embodiment of a load cell of the invention.

FIG. 88 is a perspective view of a twentieth embodiment of a load cell of the invention.

FIG. 91 is an end diagram of an example process of gauging a load cell.

FIGS. 92A and B are compression side and tension side views of the gauging process of FIG. 91.

FIG. 93 is a side view of an embodiment of a scale in which an embodiment of the load cell of the invention may be used.

FIG. 94 is an end view of the scale.

FIG. 95 is a perspective view, exploded, of the scale.

FIG. 96 is another exploded perspective view of the scale.

DETAILED DESCRIPTION

Figure 11:
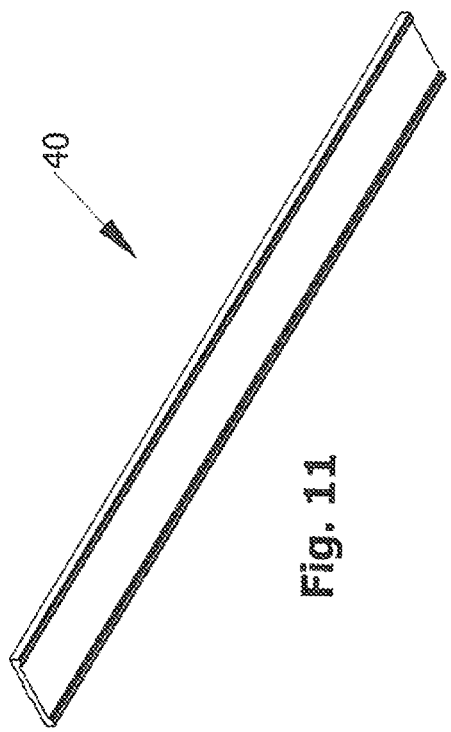
FIG. 11 is another perspective view of the fourth load cell.

The load cell of the present invention is suitable to weigh vehicles or other articles while they are in motion. The load cell is particularly well suited for weighing of vehicles moving at high speeds over road ways. The load cell may be used for example, either alone or in a scale, by embedding the load cell or scale in a roadway either during construction of the roadway or after construction by retrofit, and then weighing vehicles traveling at normal speeds over the roadway of for example of 35 to up to 80 miles per hour (130 Km/h). Examples of vehicles include motorcycles, cars, trucks, buses and the like.

FIGS. 1-3 show a first embodiment of an elongated, low profile load cell of the present invention. Load cell 10 has a generally rectangular configuration with a relatively long length and a relatively thin height or thickness, or low profile. The load cell 10 has a body portion 11, a pair of legs 12*a* and 12*b* extending downwardly from the edges of the body 11, and a central base rail 13 extending upwardly from the center of the body 11. A foot 14 is disposed downwardly from each leg 12. A top rail 15 extends upwardly from the center of the base rail 13.

The strip like configuration of the load cell 10, and the other embodiments described below, is at least three (3) times longer than it is wide, and preferably between 17-22 times longer. The range of satisfactory lengths and widths is 2.0-6.0 inches (5.08-15.24 cm) wide, and 20.0-78.7 inches (0.5-2.0 meters) long. Preferably, the scale is approximately 3.41 inches (8.66 cm) wide and a length of 1.5 meters (59.0 in.), 1.75 meters (68.8 in.) or 2.0 meters (78.7 in). The scales are very low profile. A preferred height is approximately 0.250 to 0.360 inches (0.635 to 0.914 cm).

FIGS. 4-6 show a second embodiment of the load cell 20 of the invention. Load cell 20 has a structure which is similar to load cell 10, with different dimensions.

FIGS. 7-9 show a third embodiment of the load cell 30 of the invention, again with a similar configuration and varying dimensions.

Figure 12:
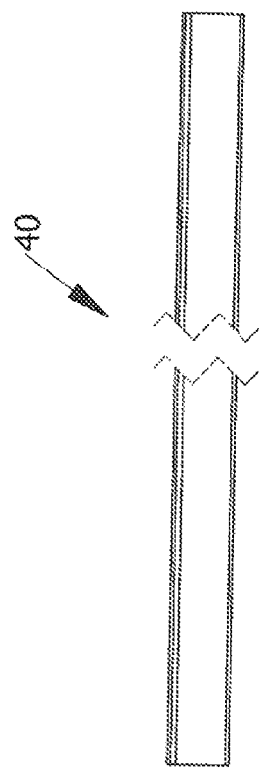
FIG. 12 is a side view of the fourth load cell.
Figure 10:
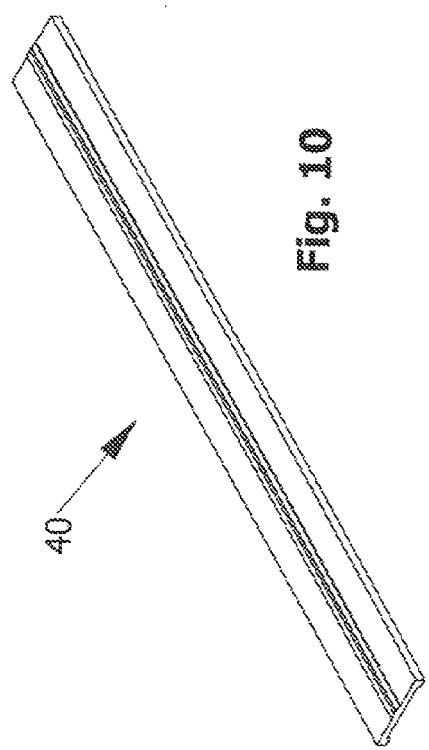
FIG. 10 is a perspective view of a fourth embodiment of the load cell of the present invention.
Figure 13:
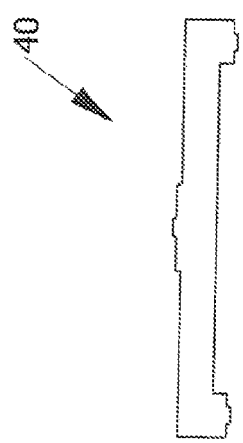
FIG. 13 is an end view of the fourth load cell.
Figure 40B:
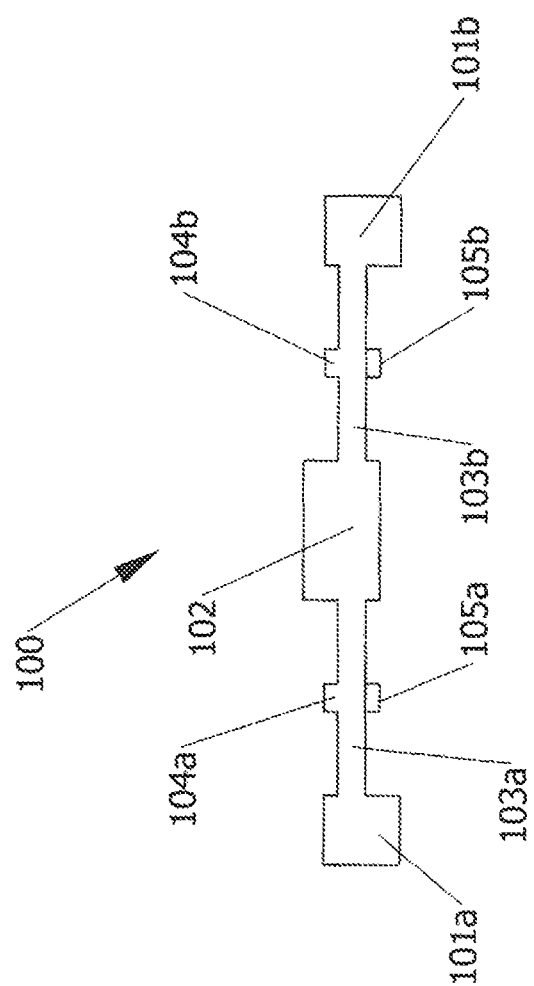
FIG. 40a/b is an end view of the tenth load cell.

FIGS. 10-12 show a fourth embodiment of the load cell 40 of the invention, again with a similar configuration and varying dimensions.

FIGS. 13-18 show a fifth embodiment of the load cell 50 of the invention. It has cutout regions 51 and 52 on the bottom of the body 53, proximate one end thereof.

FIGS. 19-23 show a sixth embodiment of the load cell 60 of the invention, which has a similar configuration to that of load cell 50, with varying dimensions.

FIGS. 24-28 show a seventh embodiment of the load cell 70 of the invention. Load cell 70 has a body portion 71, legs 72*a* and *b* and a top base portion 73. Cut out areas 74*a* and 74*b* are disposed on the bottom of the body 71. One end of the body 71 has a longitudinal inset area 75.

FIGS. 29-31 shows an eighth embodiment of the load cell 80 of the invention.

It has a body 81, legs 82*a/b* and a top base 83

FIGS. 32-36 show a ninth embodiment of the load cell 90 of the invention. Load cell 90 has a body portion 91, legs 92*a* and *b* and a top base portion 93. Cut out areas 94*a* and 94*b* are disposed on the bottom of the body 91. The ends of the body 91 have longitudinal inset areas 95*a/b*. Load cell 90 further has curvilinear, preferably semi-circular, groove 96 in the top base 93 and grooves 97*a/b* in the legs 92.

FIGS. 37-40*a/b* show a tenth embodiment of the load cell 100 of the invention. Load cell 100 has lateral portions 101*a/b* and a central portion 102, which are joined by intermediary portions 103*a/b*. Intermediary portions 103*a/b* have respective top rails 104*a/b* and bottom rails 105*a/b*. Top rails 104 extend the entire length of the load cell 100 and bottom rails 105 extend substantially the length of the load cell 100, but stop short of one end. Lateral portions 101 have apertures 106.

FIGS. 41-48 show an eleventh embodiment of the load cell 110. Load cell 110 has a body portion 111, legs 112*a* and *b* and a top base portion 113. Top base portion 113 has raised areas 114*a-j*. Cut out area 115 is disposed on the bottom of the body 111.

FIGS. 49-56 show a twelfth embodiment of the load cell 120. Load cell 120 is constructed and arranged in a manner substantially similar to that of load cell 110. Load cell 120 further has lateral apertures 125 disposed along the lateral edges of the body 121.

FIGS. 57-65 show a thirteenth embodiment of the load cell 130. Load cell 130 is also constructed and arranged in a manner substantially similar to that of load cell 110. Load cell 130 further has a lateral inset portion 135 disposed at its ends.

Figure 66:
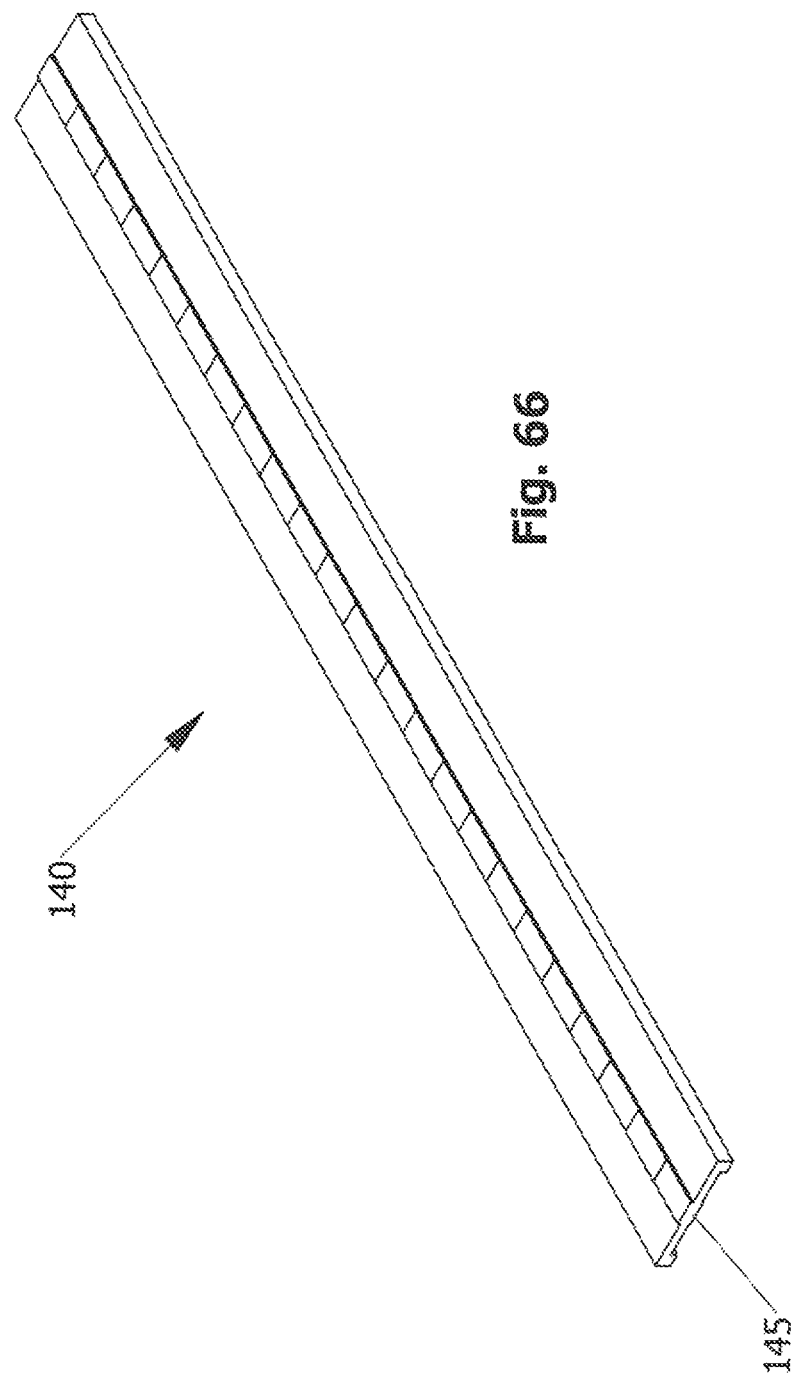
FIG. 66 is a top perspective view of a fifteenth embodiment of a load cell of the invention.
Figure 67:
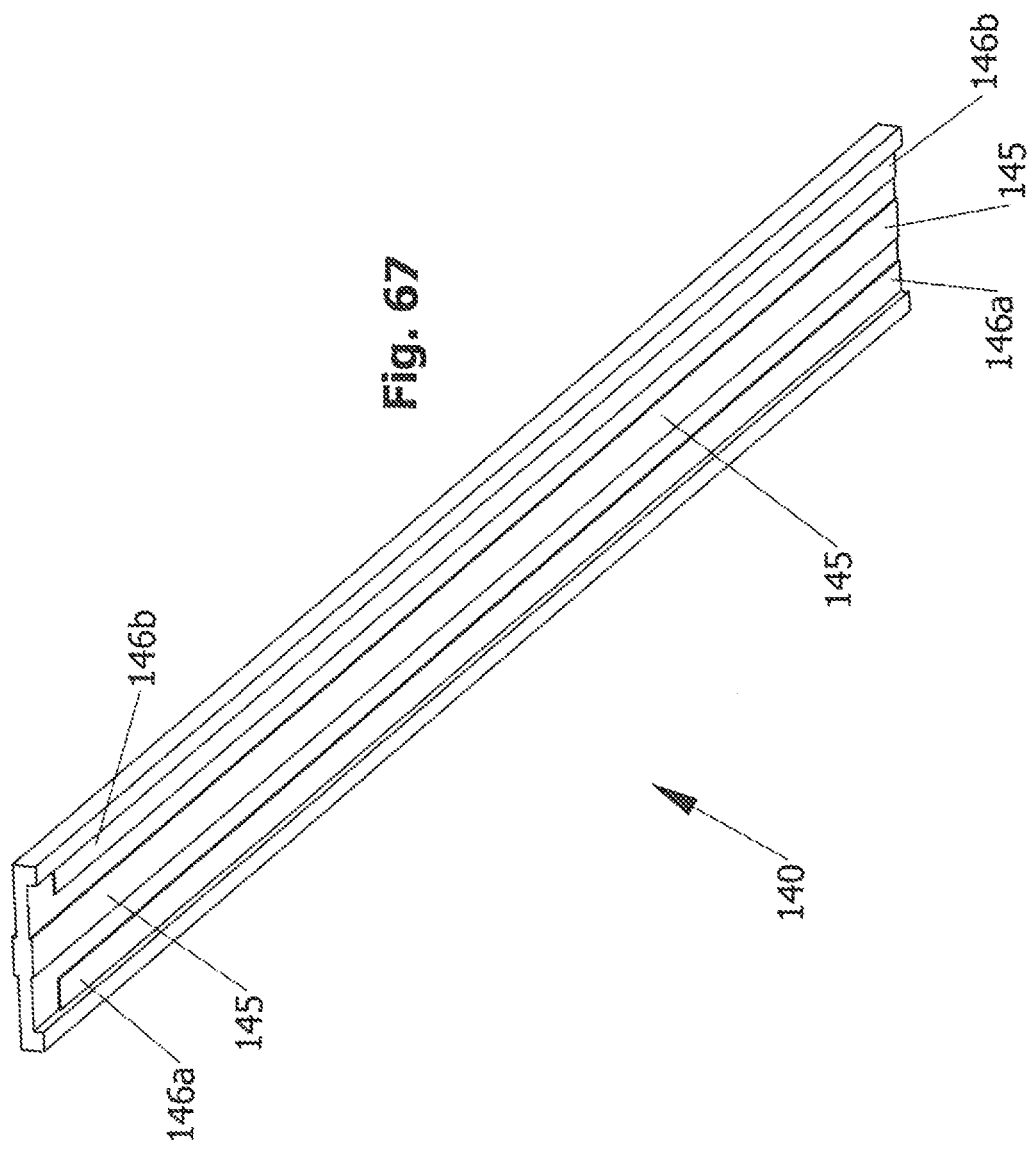
FIG. 67 is a bottom perspective view of the fifteenth load cell.

FIGS. 66 and 67 show a fourteenth embodiment of the load call 140. Load cell 140 also has a structure similar to that of load cell 110. Load cell 140 does not have a bottom inset portion. It has a central member 145 and a pair of lateral members 146*a/b* disposed longitudinally on the bottom.

FIGS. 68-75 show a fifteenth embodiment of the load cell 150. Load cell 150 includes many of the features of load call 110. The body 151 has laterally oriented cutouts 152. Cutouts are preferably curvilinear and most preferably U-shaped.

FIGS. 76-82 show a sixteenth embodiment of the load cell 160. Load cell 160 has a body portion 161, a pair of legs 162, a central row of raised members 163 on the top and laterally oriented side members 164 disposed on both sides.

FIGS. 83-86 show a seventeenth embodiment of the load call 170. Load cell 170 is constructed and arranged in a manner similar to that of load cell 160. Central raised members 173 disposed on the top surface of the body 171 have a curvilinear configuration. Central raised members 174 are also disposed on the bottom of the body 171. Lateral raised members 175 are also disposed on each side edge of the body 171, oriented downwardly from the bottom surface of the body 171.

FIG. 87 shows an eighteenth embodiment of the load cell 180. The load cell 180 has a plurality of consecutive, connected segments 181 and an axial cylindrical lumen 182.

FIG. 88 shows a nineteenth embodiment of the load cell 190. The load cell 190 is similar in basic structure to that of load cell 150 of FIGS. 68-75, except that laterally oriented side cutouts 192 are more pronounced, resulting in somewhat octagonal shaped body segments 193.

Figures 89, 90:
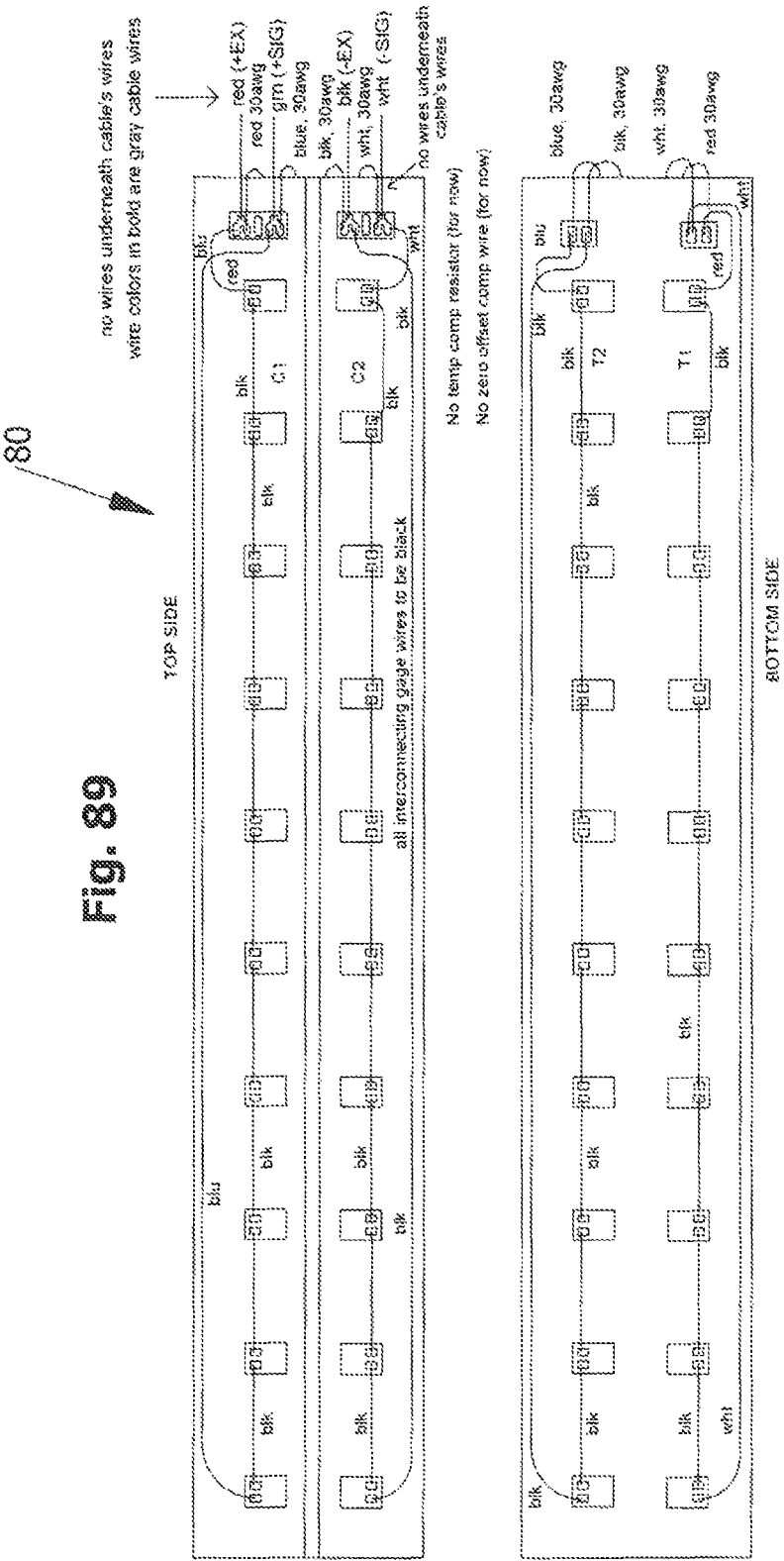
FIG. 89 is a top view of one embodiment of a gauging pattern on a load cell.
FIG. 90 is a bottom view of the gauging pattern shown in FIG. 89.

FIGS. 89-92 show methods of gauging and arrangements of strain gauges on the load cells. FIG. 89 is a top view of one embodiment of a gauging pattern on a load cell, for example load cell 80 shown in FIGS. 29-31. FIG. 90 is a bottom view of the gauging pattern shown in FIG. 89. FIG. 91 is a end diagram for an example process of gauging a twentieth embodiment of the load cell 120 of the present invention. The load cell 120 has a similar structure to that of load cell 80, except that it also has a top member 121. FIGS. 92A and B are compression side and tension side views of the gauging process of FIG. 91 on load cell 120. This embodiment of the process of gauging process involves first sandblasting the load cell 120, then dipping it in alcohol as an initial cleaning. After dipping, the load cell 120 is sprayed with alcohol as a rinse cleaning. After rinsing, gages labeled C1, C2, T1 and T2 are oriented at predetermined locations on the load cell 120, for example the locations shown in FIGS. 91 and 92. A predetermined amount of adhesive is applied to bond the gages to the load cell 120. Care should be exercised to avoid contaminating material or debris that may be present on the gage during gluing. Preferably, the gage should be inspected under magnification after glue is applied. Glue should not be placed on the top of the solder pads. Next, the assembly is cured, for example via heat in an oven. After curing, the resistance values of each gage are recorded. After verification of proper resistance values, wires are connected to the gages. After wiring, coat M is applied to the gages.

FIGS. 93-96 show an embodiment of a strip scale 150 employing an embodiment of a load cell of the present invention. The strip scale 150 has a low profile. It may be placed on a surface such as a road or a floor, either directly or indirectly as part of a larger weighing system. The strip scale 150 may be used for static weighing, but it is ideally suited for in motion weighing of vehicles or craft such as cars, trucks, aircraft, boats and other consumer, commercial, industrial, municipal or military articles or apparatus. The scale 150 is relatively long compared to known scales and very low profile. As is best shown in FIGS. 98 and 99, the scale 150 basically comprises a bottom base 151, a load cell 152, an intermediary top plate 153, and a top platform 154.

The base 151 is placed on a support surface (See FIG. 43 for example). The load cell 152 is placed on the top surface of the base 151. The top plate 153 is placed on the base 151, over the load cell 152. Pins 155 are placed (end to end) in slots 156 disposed on the top surface of the top plate 153. Platform 154 is placed over the top plate 153. Top, inner fastening screws 157 are oriented through apertures 158a and 158b (threaded) of the platform 154 and top plate 153 respectively to connect the platform 154 to the top plate 153. Lower, outer fastening screws 159 are oriented through apertures 160a and 160b (threaded) of the top plate 153 and base 151 respectively to connect the top plate 153 to the base 151.

Figure 97:
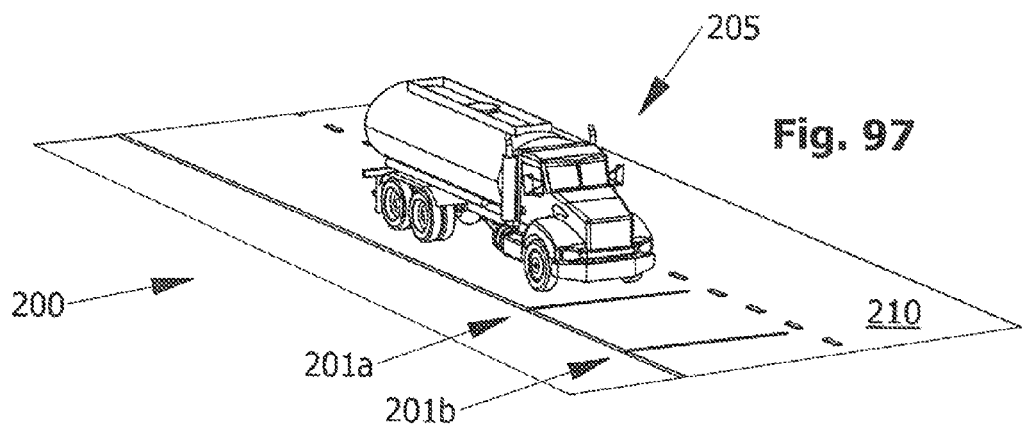
FIG. 97 shows a perspective view of an embodiment of a system using embodiment of the scale using the load cells of the invention.
Figure 98:
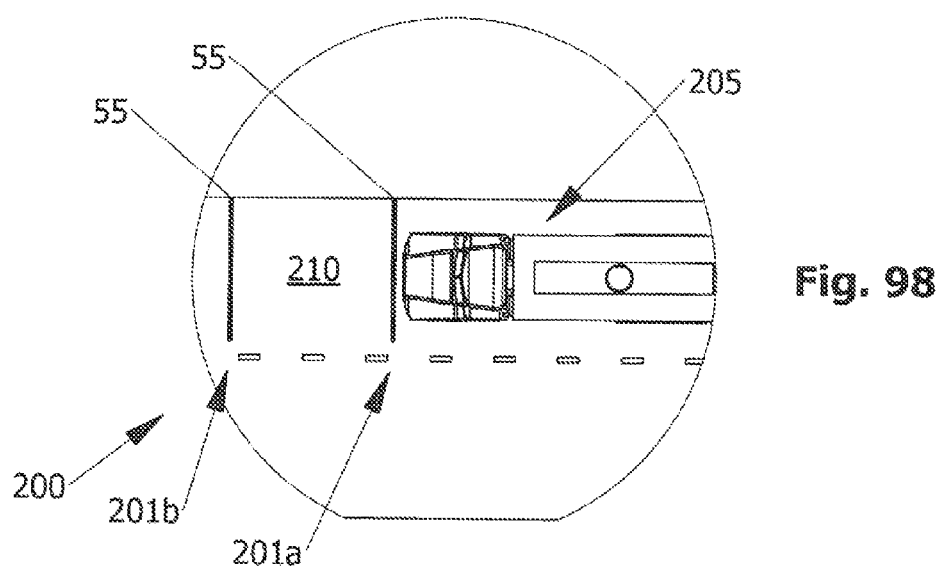
FIG. 98 is a top, plan view of the system.
Figure 99:
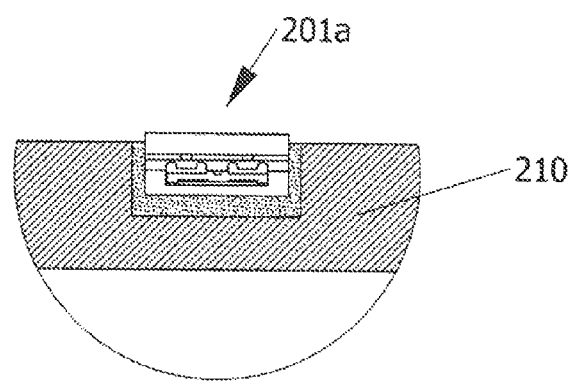
FIG. 99 is an end view, partially in cross-section, of the scale deployed in a roadway as part of the system.

FIGS. 97-99 show an embodiment of a system 200 including a pair of the strip scales 201a and 201b (utilizing an embodiment of the load cells of the invention) disposed in a roadway 210 and oriented perpendicular to the direction of traffic such that a vehicle, for example a truck 205 rolls over at least one scale 201. The scales 201A and 201B may be embedded into the roadway 210, either during initial construction of the roadway 210 or as an add on later. FIG. 43 shows a means of embedding the scale 201 in the roadway 210 The scales 201a/b are disposed a predetermined distance apart. The platform of the scale 201 may be disposed above the top surface of the roadway 210 so that it comes into direct contact with a load (i.e. a vehicle) or a predetermined distance below the surface so that intermediate material transfers force thereto. The scales 201 are communicatively connected to an electronic control system (not shown).

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A load cell having a low profile, strip configuration, comprising an elongated body having a longitudinal aspect and opposing first and second sides, a pair of legs disposed on the first side, and a rail disposed on the second side, wherein the body has a predetermined width, wherein the legs have a predetermined width, and wherein the width of the body is approximately seven times greater than the width of the legs.

2. The load cell of claim 1, wherein the body is thin and rectangular, with a predetermined length, width and thickness.

3. The load cell of claim 1, wherein the legs are disposed proximate opposing longitudinal edges of the body, the legs defining a central recess along the first side of the body between the legs.

4. The load cell of claim 1, wherein the body has a predetermined length, and wherein the legs extend the length of the body.

5. The load cell of claim 1, wherein the body has a predetermined thickness, wherein the legs have a predetermined thickness, and wherein the thickness of the body and of the legs are substantially equivalent.

6. The load cell of claim 1, further comprising a foot disposed on each leg.

7. The load cell of claim 6, wherein leg has a predetermined length, and wherein the foot extends the length of the leg.

8. The load cell of claim 6, wherein the leg has a predetermined thickness and width, and wherein the foot has a predetermined thickness and width which are both less than those of the leg.

9. The load cell of claim 1, wherein the rail is disposed centrally and longitudinally with respect to the body.

10. The load cell of claim 9, wherein the body has a predetermined length, and wherein the rail extends the length of the body.

11. The load cell of claim 1, wherein the body has a predetermined width, wherein the raid has a predetermined width, and wherein the width of the body is approximately four times greater than the width of the rail.

12. The load cell of claim 1, wherein the body has a predetermined thickness, wherein the rail has a predetermined thickness, and wherein the thickness of the body is greater than the thickness of the rail.

13. The load cell of claim 1, further comprising a second rail centrally, longitudinally on the rail.

14. The load cell of claim 13, wherein rail has a predetermined length, and wherein the second rail extends the length of the rail.

15. The load cell of claim 14, wherein the rail has a predetermined thickness and width, and wherein the second rail has a predetermined thickness and width which are both less than those of the rail.

16. The load cell of claim 1 being constructed of a unitary piece of material.

17. The load cell of claim 16, wherein the material is a metal.

18. The load cell of claim 1, wherein the low profile load cell has a thin, substantially flat configuration with a thickness less than 1.0 inch.

19. The load cell of claim 18, wherein the configuration of the scale is elongated and thin, and wherein the load cell has a length that is at least three (3) times longer than it width.

20. The load cell of claim 19, wherein the configuration of the scale is elongated, thin and 2.0-6.0 inches (5.08-15.24 cm) wide, and 20.0-78.7 inches (0.5-2.0 meters) long.

21. The load cell of claim 1, for use in electronic, in-motion weighing of vehicles or cargo passing over the load cell.

22. The load cell of claim 21, wherein the load cell is placed on or in a floor or road, or a component thereof.

23. The load cell of claim 22, wherein the base is embedded in the floor, road, or component thereof.

24. The load cell of claim 21, wherein the body has longitudinal and lateral dimensions that are substantially coextensive with the dimensions of a scale to which it is adapted to be communicatively connected.

25. The load cell of claim 24, wherein the load cell is adapted to be fixedly connected to a bottom base of a scale.

26. The load cell of claim 25, wherein the load cell is adapted to be fixedly connected to a top platform of a scale.

27. A low profile, strip electronic load cell for use in in-motion weighing of vehicles or cargo passing over the scale, the load cell having an elongated, thin geometry with a length of between 20.0-78.7 inches (0.5-2.0 meters), a width approximately 2.0-6.0 inches (5.08- 15.24 cm) and a height approximately 1.465 to 1.475 inches, comprising:
  (a) a body, the body having a rectangular shape with a longitudinal aspect, opposing top and bottom sides and opposing longitudinal edges, the body having a predetermined length, width and thickness;
  (b) a pair of legs formed unitarily with the body on the bottom side thereof, the legs being disposed proximate the opposing longitudinal edges of the body, the legs defining a central recess along the first side of the body between the legs, the legs further extending the length of the body, and
  (c) a rail formed unitarily with the body on the top side thereof, the rail being disposed centrally and longitudinally with respect to the body, the rail extending the length of the body.

28. A method of weighing vehicles or cargo moving over a surface while the vehicles or cargo are moving:
  a. providing an electronic load cell having an elongated, thin, strip geometry, comprising:
    (i) a body, the body having a rectangular shape with a longitudinal aspect, opposing top and bottom sides and opposing longitudinal edges, the body having a predetermined length, width and thickness;
    (ii) a pair of legs formed unitarily with the body on the bottom side thereof, the legs being disposed proximate the opposing longitudinal edges of the body, the legs defining a central recess along the first side of the body between the legs, the legs further extending the length of the body, and
    (iii) a rail formed unitarily with the body on the top side thereof, the rail being disposed centrally and longitudinally with respect to the body, the rail extending the length of the body, wherein the body has a predetermined width, wherein the legs have a predetermined width, and wherein the width of the body is approximately seven times greater than the width of the legs.
  b. placing the load cell on or in a surface, whereby a predetermined portion of the rail is exposed to sense the weight of the vehicle or cargo passing over the load cell;
  c. passing vehicles or cargo over the surface and the load cell; and
  d. actuating the load cell and sensing a weight.

29. A load cell having a low profile, strip configuration, comprising an elongated body having a longitudinal aspect and opposing first and second sides, a pair of legs disposed on the first side, a rail disposed on the second side, and a second rail centrally, longitudinally disposed on the rail.

30. A load cell having a low profile, strip configuration, comprising an elongated body having a longitudinal aspect and opposing first and second sides, a pair of legs disposed on the first side, and a rail disposed on the second side, wherein load cell has a thin, substantially flat configuration with a thickness less than 1.0 inch, wherein the scale is elongated and thin, and wherein the load cell has a length that is at least three (3) times longer than it width, and wherein scale is elongated, thin and 2.0- 6.0 inches (5.08- 15.24cm) wide, and 20.0- 78.7inches (0.5- 2.0 meters) long.

* * * * *